United States Patent
Suda et al.

(10) Patent No.: US 8,306,133 B2
(45) Date of Patent: Nov. 6, 2012

(54) TRANSMITTER AND METHOD FOR CONFIGURING TRANSMISSION FRAME

(75) Inventors: Hirohito Suda, Yokosuka (JP); Hiromasa Fujii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 823 days.

(21) Appl. No.: 12/443,547

(22) PCT Filed: Sep. 28, 2007

(86) PCT No.: PCT/JP2007/068976
§ 371 (c)(1),
(2), (4) Date: Jun. 5, 2009

(87) PCT Pub. No.: WO2008/038769
PCT Pub. Date: Apr. 3, 2008

(65) Prior Publication Data
US 2010/0111207 A1    May 6, 2010

(30) Foreign Application Priority Data
Sep. 29, 2006   (JP) ................. P2006-269990

(51) Int. Cl.
*H04L 27/20* (2006.01)

(52) U.S. Cl. ........................ 375/260; 375/308
(58) Field of Classification Search ............. 375/260, 375/295, 302, 308
See application file for complete search history.

(56) References Cited

U.S. PATENT DOCUMENTS

| 6,510,133 B1 * | 1/2003 | Uesugi ................. 370/208 |
| 2003/0031121 A1 | 2/2003 | Sudo |

FOREIGN PATENT DOCUMENTS

| JP | 8 265312 | 10/1996 |
| JP | 2004 56552 | 2/2004 |
| JP | 2004 165720 | 6/2004 |
| WO | 02 41548 | 5/2002 |

* cited by examiner

*Primary Examiner* — David B. Lugo
(74) *Attorney, Agent, or Firm* — Oblon, Spivak, McClelland, Maier & Neustadt, L.L.P.

(57) ABSTRACT

A transmitter which transmits information in transmission frame to a receiver, the transmission frame including multiple transmission symbols and guard intervals obtained by replicating a fixed time period of a transmission symbol, generates a transmission frame by making phases of one transmission symbol out of two transmission symbols and a guard interval thereof continuous with phases of the other transmission symbol and a guard interval thereof, when the two continuous transmission symbols are the same.

11 Claims, 22 Drawing Sheets

TRANSMITTER AND METHOD FOR CONFIGURING TRANSMISSION FRAME

TECHNICAL FIELD

The present invention relates to a transmitter which transmits information in transmission frame to a receiver and a method for configuring a transmission frame in the transmitter.

BACKGROUND ART

The OFDM (Orthogonal Frequency Division Multiplexing) system is a system for dividing information to be transmitted into multiple carriers (hereinafter referred to as subcarriers) which are orthogonal to one another, and for modulating each subcarrier. Specifically, an OFDM signal is generated by implementing the inverse fast Fourier transform (IFFT) on a symbol mapped in accordance with the multiphase PSK modulation or the multilevel QAM modulation, to which each subcarrier is applied, at the transmitting end. On the other hand, the OFDM signal is demodulated by implementing the fast Fourier transform (FFT) at the receiving end. The OFDM signal with finite duration generated by the IFFT is hereinafter referred to as "a transmission symbol".

Generally, when radio communications are conducted under an environment where the transmitting and receiving ends cannot directly see each other, an antenna at the receiving end receives multiple radio waves having reflection paths different from one another (multipath waves), which leads to difference in arrival time delay between radio waves. Accordingly, as shown in FIG. 1, a method for adding a guard interval to each transmission symbol at the transmitting end is used in order to absorb the difference in arrival time delay caused by the multipaths.

In other words, a guard interval is added before or after a transmission symbol, and the transmission symbol and the guard interval thereof are set to be a transmission unit. Thus, a frame has a configuration including multiple transmission units. When the difference in arrival time between a radio wave which arrives fastest and a radio wave which arrives latest falls within the time length of a guard interval, use of the guard interval makes it possible to suppress the influence of many radio waves even if the many radio waves are received by the receiving end.

However, when a reflected wave (a delayed wave) which exceeds the guard interval length occurs, interference from preceding and subsequent symbols in terms of time (hereinafter referred to as "intersymbol interference") occurs. As a result, great distortion is caused in a received symbol, so that the communication quality deteriorates. The difference in arrival time is a phenomenon caused by the propagation environment of radio waves. Accordingly, it is conceivable that controlling the time delay itself is impossible. In addition, the difference in arrival time changes depending on the place and time range of communication. In other words, the difference in arrival time may fall within the guard interval or may exceed the guard interval.

As a first method to solve the problem, considered is a method for making the guard interval length long enough to exceed the difference in arrival time, by taking into account the maximum difference in time delay.

Additionally, as a second method, considered is a method in which an advanced signal processing is employed at the receiving end. As a third method, considered is a method for appropriately controlling a guard interval length in accordance with the propagation environment.

On the other hand, proposed is a method for decreasing the number of guard intervals by conducting communications using a signal where two of the same multicarrier data continues (please refer to Patent Document 1).

Patent Document 1: Japanese Patent Application Laid-open No. 2004-56552

DISCLOSURE OF THE INVENTION

However, since the guard interval length is always maintained for a long time in the above-mentioned first method, a time during which information is not transmitted increases accordingly. Hence, there is a problem that information transmission efficiency decreases in proportion to an increase in guard interval length.

Moreover, in the above-mentioned second method, more reliable information is reproduced, by deducting preceding and subsequent symbols from a received signal having intersymbol interference. Here, the deducted preceding and subsequent symbols are estimated to be superimposed in the received signal. However, it is difficult to estimate the preceding and subsequent symbols and to require advanced processing. Interference of a target symbol is superimposed over the preceding and subsequent symbols. For this reason, it is necessary to estimate in order to estimate the preceding and subsequent symbols with high accuracy. In other words, this is a relation of a tripartite deadlock. It is difficult to solve this even if a complicated process is applied repeatedly.

Furthermore, in the above-mentioned third method, there is a problem that different frame configurations are mixed, and that the frame time length of each frame varies. Accordingly, although the method can be applied to one-to-one communications, the method requires complicated control for absorbing variations in frame time length when being applied to one-to-many (multicast) communications, the SNF (Single Frequency Network) and the like. Moreover, since the frame boundaries of the respective frames are different from each other, application of the multi-user interference removal technology produces a program of deteriorating the communication quality and also of making the processing more complicated.

In the above-mentioned method described in Patent Document 1, since the number of guard intervals decreases, it becomes difficult to suppress multipath influence. In other words, there is a problem that the communication quality deteriorates, since the intersymbol interference occurs and great distortion occurs in a received symbol signal.

Considering the above problems, an object of the present invention is to provide a transmitter and a method for configuring a transmission frame, which are capable of securely suppressing multipath influence by equivalently increasing a guard interval length without changing a frame time length.

In order to achieve the above object, a first aspect of the present invention is a transmitter which transmits information in transmission frame to a receiver including multiple guard intervals that a transmission symbol and a fixed time period of the transmission symbol are replicated. The transmitter is characterized by including a transmission frame generator (transmission frame generators 10a, 10b) configured to, when two continuous transmission symbols are the same, generate the transmission frame by making phases of one transmission symbol out of the two transmission symbols and a guard interval thereof continuous with phases of the other transmission symbol and a guard interval thereof.

With the aspect, it is possible to easily obtain the effects to increase a guard interval length without changing the frame length of a transmission frame.

A second aspect is summarized in that, in the transmitter according to the above aspect, the transmission frame generator includes a first guard interval adder (a GI front adder 16a) configured to add the guard interval to immediately before an odd-numbered transmission symbol and a second guard interval adder (a GI rear adder 17) configured to add the guard interval to immediately after an even-numbered transmission symbol.

With the aspect, it is possible to have a frame configuration having a guard interval equivalent to a time length that two guard intervals and one transmission symbol are added. Therefore, it is made possible to securely suppress the detrimental effect of a multipath even if a propagation environment has deteriorated.

A third aspect is summarized in that, in the transmitter according to the above aspect, the transmission frame generator includes a guard interval adder (a GI adder 16b) configured to add the guard intervals to odd- and even-numbered transmission symbol; and a phase shifter (a phase shifter 30) configured to, after adding the guard interval, shift phases of the even-numbered transmission symbol and the guard interval thereof such that the phases of the even-numbered transmission symbol and the guard interval thereof are continuous with the phases of the odd-numbered transmission symbol and the guard interval thereof.

With the aspect, it is possible to have a frame configuration having a guard interval equivalent to a time length that two guard intervals and one transmission symbol are added. Therefore, it is made possible to securely suppress the detrimental effect of a multipath even if a propagation environment has deteriorated.

A fourth aspect is summarized in that, in the transmitter according to the above aspects, the transmission frame generator further includes a same symbol generator (a transmission symbol storage 13, a first switch 14, a switch controller 22) configured to generate two of the same transmission symbols by outputting the odd-numbered transmission symbol as the even-numbered transmission symbol.

With the aspect, it is possible to generate the same transmission symbols. As a result, it is possible to easily realize the frame configuration according to the above aspects.

A fifth aspect is summarized in that, in the transmitter according to the above aspects, the transmission frame generator further includes a propagation environment judging section (a propagation environment judging section 21) configured to judge a propagation environment in between with the receiver. The same symbol generator switches whether or not to generate the two of the same transmission symbols in accordance with the propagation environment.

With the aspect, it is possible to select, in accordance with the propagation environment, whether or not to have the transmission frame configuration according to the above aspect.

A sixth aspect is summarized in that, in the transmitter according to the above aspect, the transmission frame generator further includes a window processor (a window processor 31) configured to execute a window processing to attenuate head and end parts, on the time axis, of a transmission unit (an OFDM symbol) composed of a transmission symbol (an effective symbol interval) and a guard interval (GI) thereof. The window processor omits the window processing for a connected part of two transmission units having continuous phases.

With the aspect, it is possible to more securely demodulate at the receiving end, straddling the connected part of two transmission units having continuous phases.

A seventh aspect is summarized in that, in the transmitter according to the above aspect, the window processor executes: a first window processing to attenuate head and end parts, on the time axis, of a transmission unit whose phase is not continuous with the phases of the preceding and subsequent transmission units; and a second window processing to attenuate head and end parts, on the time axis, of two transmission units having continuous phases. A window length applied to the second window processing is longer than a window length applied to the first window processing.

With the aspect, it is possible to decrease the amount of out-of-band emission in a case of performing the second window processing more than a case of performing the first window processing.

An eighth aspect is summarized in that, in the transmitter according to the above aspect, the transmitter communicates with multiple receivers (mobile stations MS) by a multicarrier communication method (OFDM or OFDMA), and the transmission frame is divided into multiple communication channels in at least one of a frequency direction and a time direction. The transmission frame generator generates a transmission unit composed of a transmission symbol and a guard interval thereof. The transmission frame generator generates a transmission unit whose phase is not continuous with the preceding and subsequent transmission units for a communication channel categorized into a first group among many communication channels, and generates two transmission units having continuous phases for a communication channel categorized into a second group among many communication channels.

With the aspect, it is possible in the multicarrier communication method to transmit transmission units having continuous phases only for a part of communication channels and to transmit transmission units whose phases are not continuous for the other communication channels.

A ninth aspect is summarized in that the transmitter according to the above aspect further includes a modulation symbol generator (a S/P converter 11) configured to generate a modulation symbol corresponding to each subcarrier by implementing modulation and serial/parallel conversion on information to be transmitted to the receiver; a modulation symbol storage (a modulation symbol storage 41) configured to store the modulation symbol generated by the modulation symbol generator, a modulation symbol selector (a modulation symbol selector 42) configured to select any one of the modulation symbol generated by the modulation symbol generator and the modulation symbol stored by the modulation symbol storage; and a generator (an IFFT section 12) configured to generate a transmission symbol by implementing the inverse Fourier transform and parallel/serial conversion on the modulation symbol selected by the modulation symbol selector.

With the aspect, it is possible in the multicarrier communication method to decide whether or not to transmit transmission units having continuous phases on the frequency axis.

A tenth aspect is summarized in that, in the transmitter according to the above aspect, the transmission frame generator further includes a first guard interval adder (the GI front adder 16a) configured to add a guard interval to immediately before an odd-numbered transmission symbol, a second guard interval adder (the GI rear adder 17) configured to add a guard interval to immediately after an even-numbered transmission symbol, and a window processor (the window processor 31) configured to execute a window processing to attenuate head and end parts, on the time axis, of a transmission unit composed of a transmission symbol and a guard interval thereof. The second guard interval adder shifts a connected part of a transmission symbol and a guard interval thereof forward on the time axis.

With the aspect, it is possible to more securely conduct demodulation at the receiving end even if the window processing cannot be omitted.

An eleventh aspect is summarized in that, in the transmitter according to the above aspect, the transmitter further includes a transmission symbol generator (the S/P converter 11, a switch 43, IFFT sections 12A and 12B) for generating a second transmission symbol for a communication channel categorized into the second group as well as generating a first transmission symbol for a communication channel categorized into the first group. The transmission frame generator further includes a first transmission unit generator (a GI adder 51) configured to generate a first transmission unit composed of a first transmission symbol and a guard interval thereof; and a second transmission unit generator (the transmission symbol storage 13, the first switch 14, the second switch 15, the GI front adder 16a, the GI rear adder 17, a third switch 18) configured to generate two second transmission units having continuous phases by making phases of one second transmission symbol out of the two continuous second transmission symbols and a guard interval thereof continuous with phases of the other second transmission symbol and a guard interval thereof. Furthermore, the transmission frame generator includes a first window processor (a window processor 52) configured to attenuat head and end parts of the first transmission unit generated by the first transmission unit generator, a second window processor (the window processor 31) configured to attenuat head and end parts of the two second transmission units having continuous phases, which have been generated by the first transmission unit generator, and a combining section (a combining section 53) configured to combine output of the first window processor and output of the second window processor.

According to the aspect, the window processing appropriate to transmission units having continuous phases and the window processing appropriate to transmission units having discontinuous phases can be used in combination.

A twelfth aspect is summarized in that a method for configuring a transmission frame in a transmitter which transmits information in transmission frame to a receiver including multiple transmission symbols and guard intervals that a fixed time period of the transmission symbol is replicated, characterized by comprising the step of generating the transmission frame by making phases of one transmission symbol out of the two transmission symbols and a guard interval thereof continuous with phases of the other transmission symbol and a guard interval thereof when two continuous transmission symbols are the same.

BEST MODES FOR CARRYING OUT THE INVENTION

Next, with reference to the drawings, descriptions will be given of first to fifth embodiments of the present invention. In the following descriptions of the drawings in the first to fifth embodiments, the same or similar parts are assigned to the same or similar symbols.

[Configuration Example of Transmission Frame]

Figure 1:
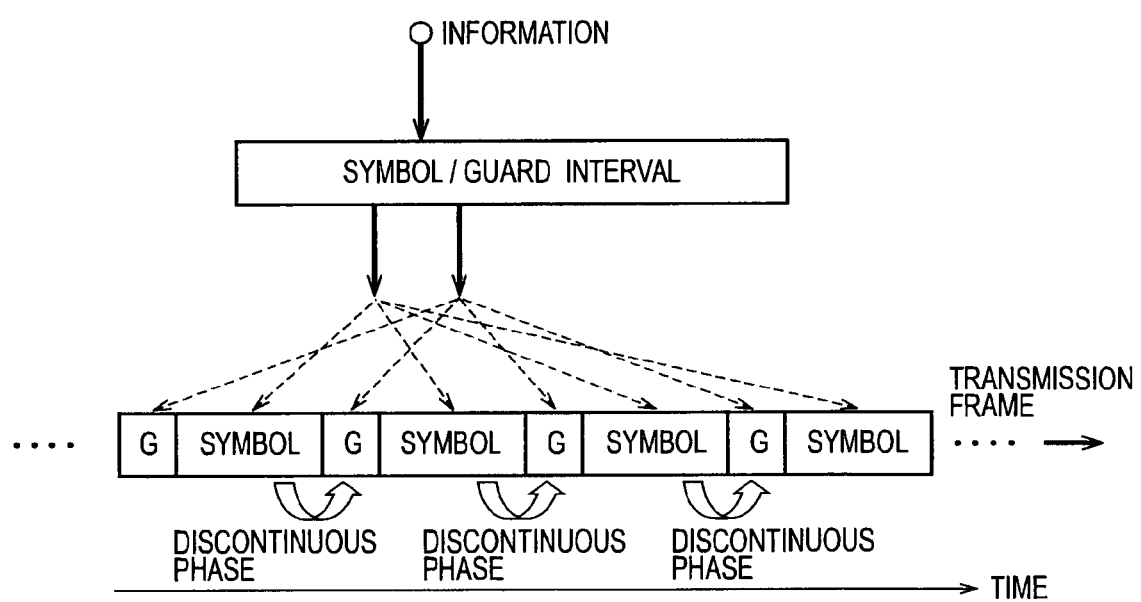
FIG. 1 is a view showing an example of a frame configuration according to a background art of the present invention.
Figure 2:
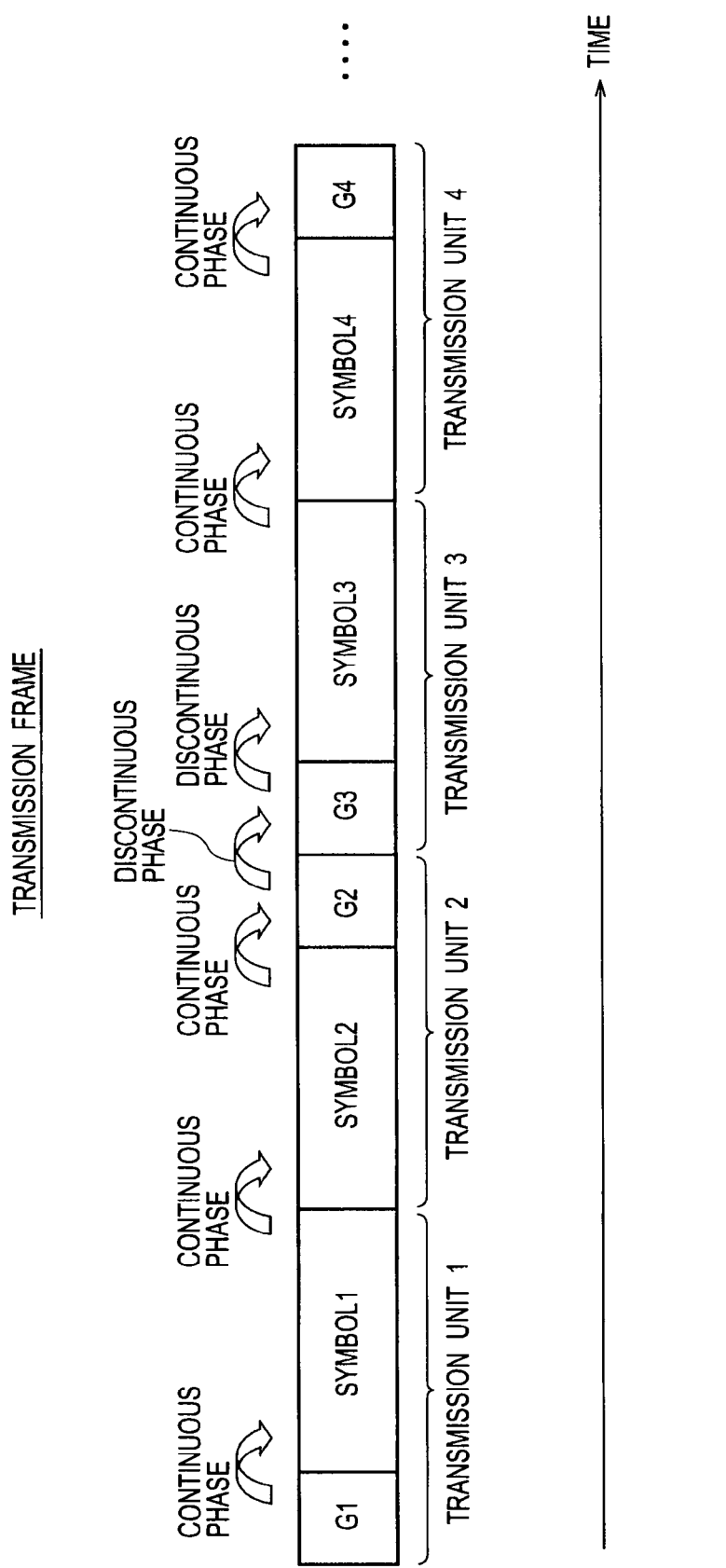
FIG. 2 is a view showing a basic configuration of a transmission frame according to embodiments of the present invention.

Before the descriptions of transmitters according to the first to fifth embodiments, descriptions will be given of a configuration example of a transmission frame used by the transmitters according to the first to fifth embodiments. FIG. 2 is a view showing a basic configuration of the transmission frame used by the transmitters according to the first to fifth embodiments.

As shown in FIG. 2, the transmission frame is configured of a transmission symbol and a guard interval (hereinafter abbreviated to as "GI") in which a fixed time period of the transmission symbol is replicated, and two transmission symbols and two GIs are alternatively arranged.

A GI (G1) that the last fixed time period of a first transmission symbol 1 is replicated is added to immediately before the first transmission symbol 1, and the phases of the GI (G1) and the transmission symbol 1 are continuous. A GI (G2) that the first fixed time period of a second transmission symbol 2 is replicated is added to immediately after the second transmission symbol 2, and the phases of the transmission symbol 2 and the GI (G2) are continuous.

Here, when the transmission symbols 1 and 2 are the same information (symbols), the phase of the transmission symbol 1 is continuous with the phase of the transmission symbol 2. In this case, an amount of one transmission symbol is transmitted by transmission units 1 and 2.

Since the phase of the transmission symbol 1 is continuous with that of the transmission symbol 2, the receiving end can perform the FFT straddling the boundary of the transmission symbols 1 and 2. In other words, it is possible to equivalently obtain a GI equivalent to a time length that two GIs and one transmission symbol are added.

FIRST EMBODIMENT

In the embodiment, descriptions will be given of the transmitter which transmits information by the OFDM system.

(Configuration Example of Transmitter)

Figure 3:
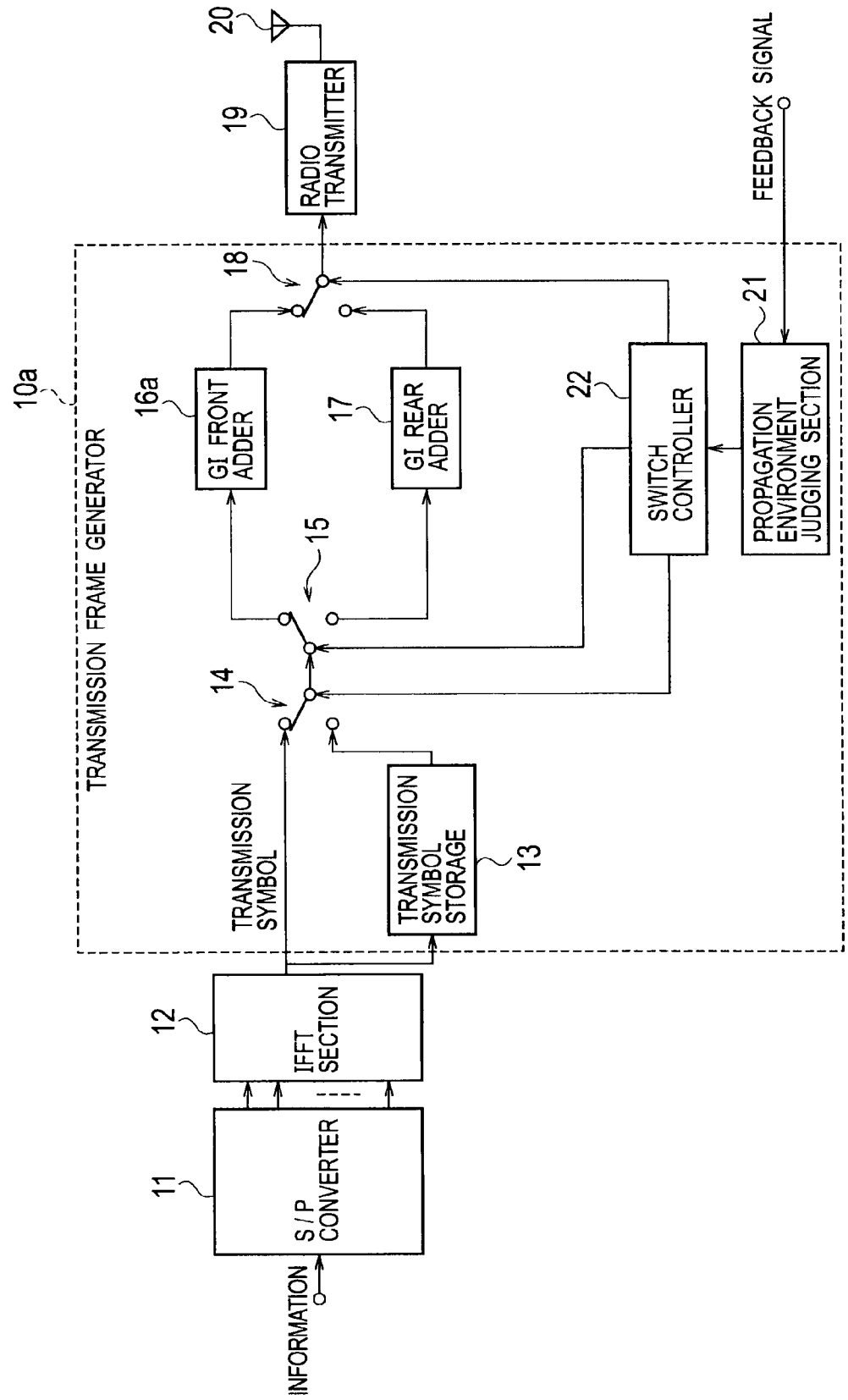
FIG. 3 is a functional block diagram showing a configuration example of a transmitter according to a first embodiment of the present invention.

Descriptions will be given of a configuration example of the transmitter according to the embodiment. FIG. 3 is a functional block diagram showing the configuration example of the transmitter according to the embodiment. The transmitter according to the embodiment transmits information to a receiver (unillustrated) by the transmission frame unit.

The transmitter according to the embodiment includes a serial/parallel converter (a S/P converter) 11, an IFFT section 12, a transmission symbol storage 13, a first switch 14, a second switch 15, a GI front adder 16a, a GI rear adder 17, a third switch 18, a radio transmitter 19, an antenna 20, a propagation environment judging section 21, and a switch controller 22.

Information (data) on which the error correction code process and the modulation process are performed is inputted to the S/P converter 11. The S/P converter 11 parallelizes the inputted information and outputs it as multiple of subcarriers. The IFFT section 12 performs the IFFT process on the subcarriers and outputs a transmission symbol to the transmission symbol storage 13 and the first switch 14. The transmission symbol storage 13 generates the replication of the transmission symbol by storing the transmission symbol.

The transmission symbol storage 13, the first switch 14, the second switch 15, the GI front adder 16a, the GI rear adder 17, the third switch 18, the propagation environment judging section 21, and the switch controller 22 function as a transmission frame generator 10a for generating a transmission frame having a configuration shown in FIG. 2. The transmission frame generator 10a operates in any one of first and second transmission modes in accordance with a propagation environment. Specifically, the first transmission mode is used in an excellent propagation environment, and a second transmission mode is used in a deteriorated propagation environment.

The first switch 14 selects and outputs any one of a transmission symbol outputted by the IFFT section 12 and the replication of a transmission symbol outputted by the transmission symbol storage 13 under the control of the switch controller 22. In the first transmission mode, the first switch 14 is kept in a state of always selecting the transmission symbol outputted by the IFFT section 12. On the other hand, in the second transmission mode, the transmission symbol outputted by the IFFT section 12 and the replication of the transmission symbol outputted by the transmission symbol storage 13 are alternatively selected and outputted.

The second switch 15 outputs the transmission symbol or the replication thereof from the first switch 14 to any one of the GI front adder 16a and the GI rear adder 17 under the control of the switch controller 22. The second switch 15 outputs an odd-numbered transmission symbol to the GI front adder 16a and outputs an even-numbered transmission symbol to the GI rear adder 17.

The GI front adder 16a generates a GI by replicating the last fixed time period of a transmission symbol and adds the is generated GI to immediately before the transmission symbol. On the other hand, the GI rear adder 17 generates a GI by replicating the first fixed time period of a transmission symbol and adds the generated GI to immediately after the transmission symbol.

The third switch 18 outputs the transmission symbols, to which the GIs are added by the GI front adder 16a and the GI rear adder 17, to the radio transmitter 19 under the control of the switch controller 22. Moreover, the third switch 18 operates similarly to the second switch 15. When the second switch 15 selects the GI front adder 16a side, the third switch 18, too, selects the GI front adder 16a side. When the second switch 15 selects the GI rear adder 17 side, the third switch 18, too, selects the GI rear adder 17 side.

In this manner, the switch controller 22 controls by switching the second switch 15 and the third switch 18 in accordance with whether a transmission symbol is an odd- or even-numbered.

The radio transmitter 19 performs the radio processing such as D/A conversion, upconvert, an amplification process on an output signal of the third switch 18. The output signal generated by the radio processing is outputted from the antenna 20.

The propagation environment judging section 21 judges a propagation environment based on a feedback signal from the receiver. Specifically, the receiver measures a delay profile and monitors whether or not a delayed wave which exceeds the GI length has been observed. Then, the monitoring result by the receiver is informed as a feedback signal to the transmitter according to the embodiment. The switch controller 22 controls the first switch 14 in accordance with the propagation environment judged by the propagation environment judging section 21.

(Method for Configuring Transmission Frame)

Figure 4:
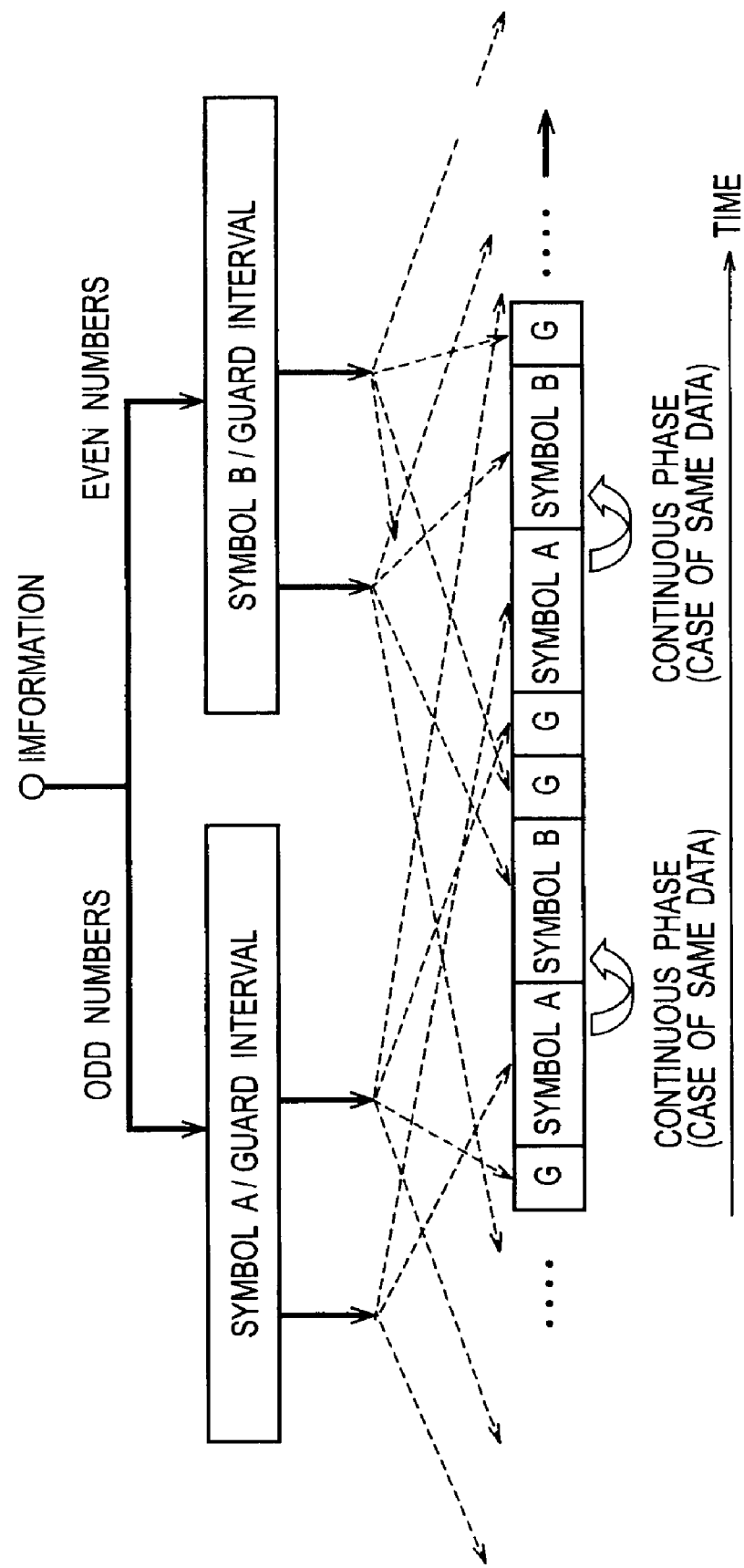
FIG. 4 is a view showing an example of a frame configuration in first and second transmission modes of the transmitter according to the first embodiment of the present invention.

Next, descriptions will be given of a frame configuration method according to the embodiment. FIG. 4 is a view showing the frame configuration method according to the embodiment.

The frame configuration method according to the embodiment repeats to add a GI immediately before an odd-numbered transmission symbol A and a GI to immediately after an even-numbered transmission symbol B.

When data (information) of the odd-numbered transmission symbol A does not agree with that of the even-numbered transmission symbol B in the first transmission mode, the phases of the odd-numbered transmission symbol A and the even-numbered transmission symbol B are not continuous. On the other hand, when data (information) of the odd-numbered transmission symbol A agrees with that of the even-numbered transmission symbol B, the phases of the odd-numbered transmission symbol A and the even-numbered transmission symbol B are continuous.

In the second transmission mode, the odd-numbered transmission symbol B which is the same as the odd-numbered transmission symbol A is generated by replicating the odd-numbered transmission symbol A. Therefore, the data of the odd-numbered transmission symbol A always agrees with that of the even-numbered transmission symbol B, and the phases of the odd-numbered transmission symbol A and the even-numbered transmission symbol B are continuous.

(Operational Summary of Transmitter)

Figure 5:
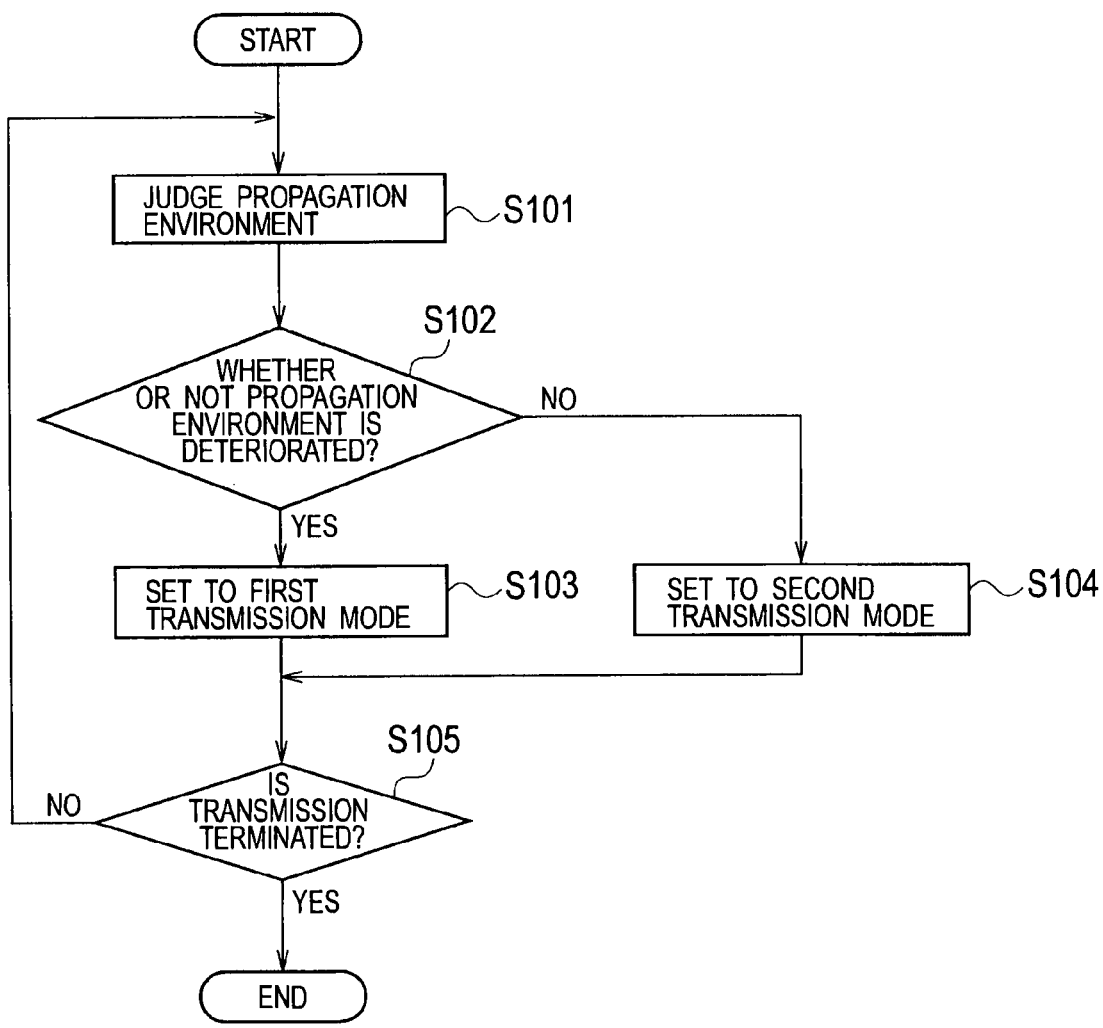
FIG. 5 is a flow chart showing an operation summary of a transmission frame generator according to the first embodiment of the present invention.

Next, descriptions will be given of an operational summary of the transmitter according to the embodiment. FIG. 5 is a flow chart showing the operational summary of the transmitter according to the embodiment.

In Step S101, the propagation environment judging section 21 judges a propagation environment.

In Step S102, the switch controller 22 selects any one of the first and second transmission modes in accordance with the propagation environment judged in Step S101. Specifically, when a long time delay is not observed at the receiving end, the processing goes to Step S103. On the other hand, when a long time delay is observed at the receiving end, the processing goes to Step S104.

In Step S103, the propagation environment judging section 21 sets the switch controller 22 to the first transmission mode.

In Step S104, the propagation environment judging section 21 sets the switch controller 22 to the second transmission mode.

In Step S105, the switch controller 22 judges whether or not the transmission operation is terminated. When the transmission operation is terminated, the transmission operation terminates. On the other hand, when the transmission operation is continued, the processing goes back to Step S101.

(Operational Example of Transmission Frame Generator in First Transmission Mode)

Figure 6:
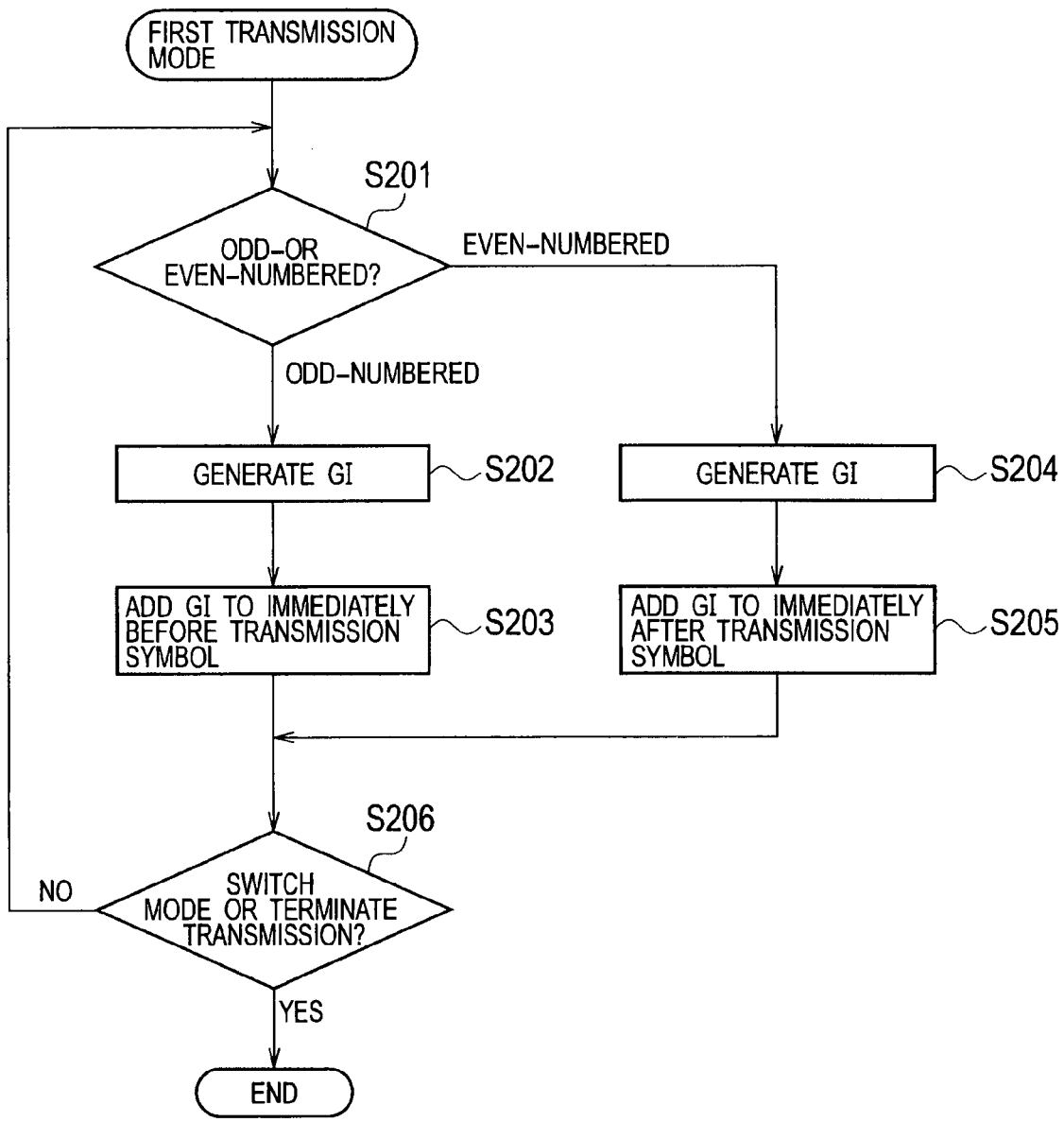
FIG. 6 is a flowchart showing an operational example in the first transmission mode of the transmission frame generator according to the first embodiment of the present invention.

Next, descriptions will be given of an operational example in the first transmission mode in the transmission frame generator 10a according to the embodiment. As described above, in the first transmission mode, the switch controller 22 controls the first switch 14 in a manner of selecting the IFFT section 12 side. FIG. 6 is a flow chart showing an operational example in the first transmission mode in the transmission generator 10a according to the embodiment.

In Step S201, the switch controller 22 judges whether or not a transmission symbol is an odd- or even-numbered. When the transmission symbol is an odd-numbered, the processing goes to Step S202. On the other hand, when a transmission symbol is an even-numbered, the processing goes to Step S204.

In Step S202, the GI front adder 16a generates a GI by replicating the last fixed time period of a transmission symbol. In Step S203, the GI front adder 16a adds the GI generated in Step S202 to immediately before the transmission symbol.

In Step S204, the GI rear adder 17 generates a GI by replicating the first fixed time period of a transmission symbol. In Step S205, the GI rear adder 17 adds the GI generated in Step S204 to immediately after the transmission symbol.

In Step S206, the switch controller 22 judges whether to switch the mode or terminate the transmission. When the mode is switched or the transmission is terminated, the first transmission mode is terminated. On the other hand, when the mode is not switched or the transmission is not terminated, the processing goes back to Step S201.

(Operational Example of Transmission Frame Generator in Second Transmission Mode)

Figure 7:
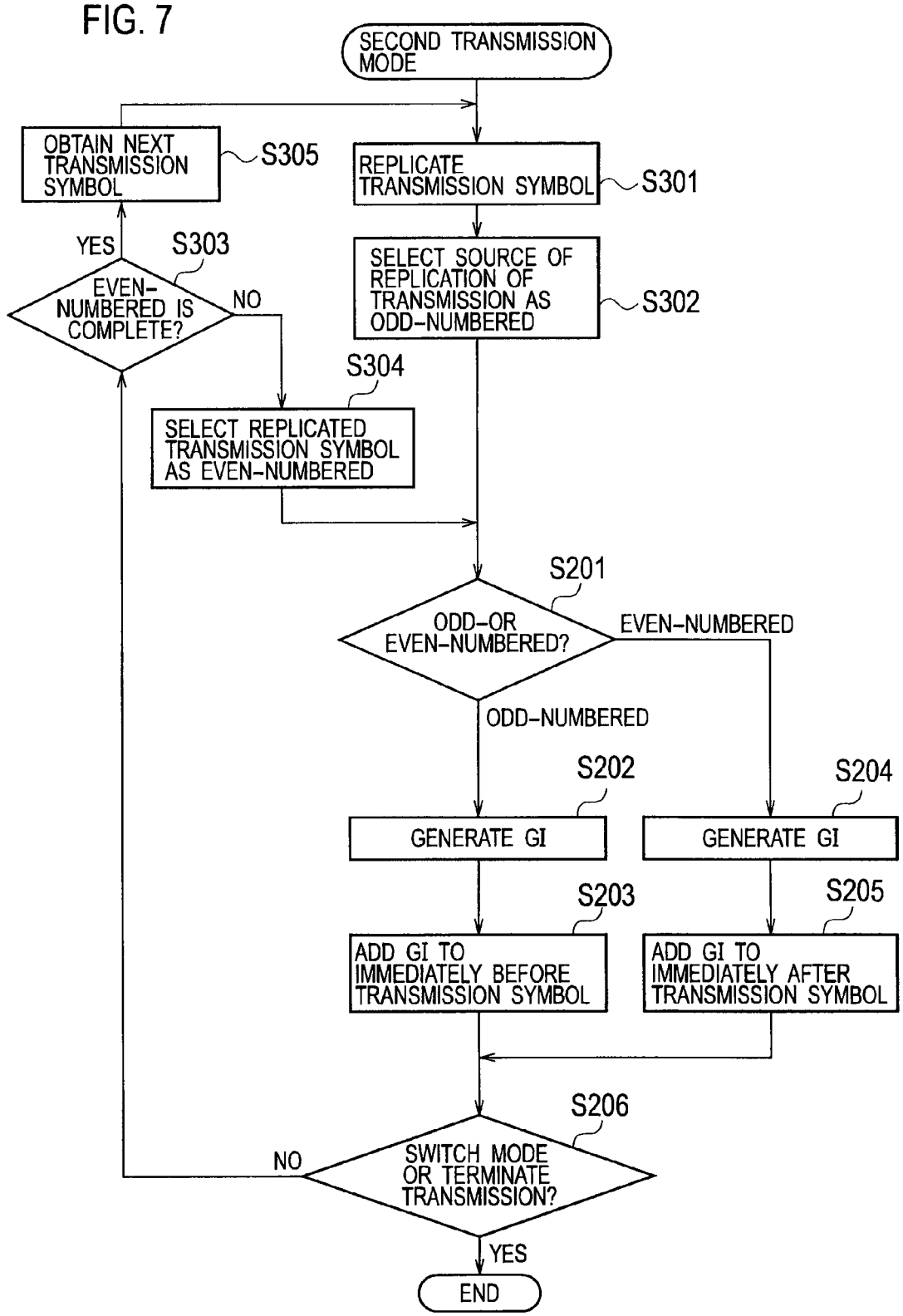
FIG. 7 is a flow chart showing an operational example in the second transmission mode of the transmission frame generator according to the first embodiment of the present invention.

Next, descriptions will be given of an operational example in the second transmission mode in the transmission frame generator 10a according to the embodiment. However, the overlapped descriptions will be omitted of the same operations as those in the operational example of the first transmission mode. FIG. 7 is a flow chart showing an operational example in the second transmission mode in the transmission frame generator 10a according to the embodiment.

In Step S301, the transmission symbol storage 13 stores a transmission symbol outputted by the IFFT section 12 and generates the replication of the transmission symbol.

In Step S302, the first switch 14 selects the transmission symbol of the source of the replication, that is, the transmission symbol outputted by the IFFT section 12 as an odd-numbered transmission symbol.

In Steps S201 to 206, the same operations as those in the first transmission mode are executed.

In Step S303, the switch controller 22 judges whether or not the processing for the even-numbered transmission symbol is complete. When the processing for the even-numbered transmission symbol is complete, the processing goes to Step S305. On the other hand, when the processing for the even-numbered transmission symbol is not complete, the processing goes to Step S304.

In Step S304, the first switch 14 selects the replication of the transmission symbol stored in the transmission symbol storage 13 as the even-numbered transmission symbol. When the replication of the transmission symbol stored in the transmission symbol storage 13 is selected as an even-numbered transmission symbol, the processing goes to Step S201.

In contrast, when the processing for the even-numbered transmission symbol is complete, the next transmission symbol outputted by the IFFT section 12 is obtained in Step S305, and then the processing goes back to Step S301.

(Actions and Effects)

As described above in detail, while maintaining the same transmission efficiency as a conventional one in the first transmission mode, the transmitter according to the embodiment switches the mode to the second transmission mode when the propagation environment has deteriorated. The transmission efficiency halves in the second transmission mode, but it is possible to equivalently obtain a GI equivalent to a time length that two GIs and one transmission symbol are added and securely suppress the multipath influence.

SECOND EMBODIMENT

In descriptions of a second embodiment, the descriptions will be given mainly of points different from the first embodiment and the overlapped descriptions will be omitted.

(Configuration Example of Transmitter)

Figure 8:
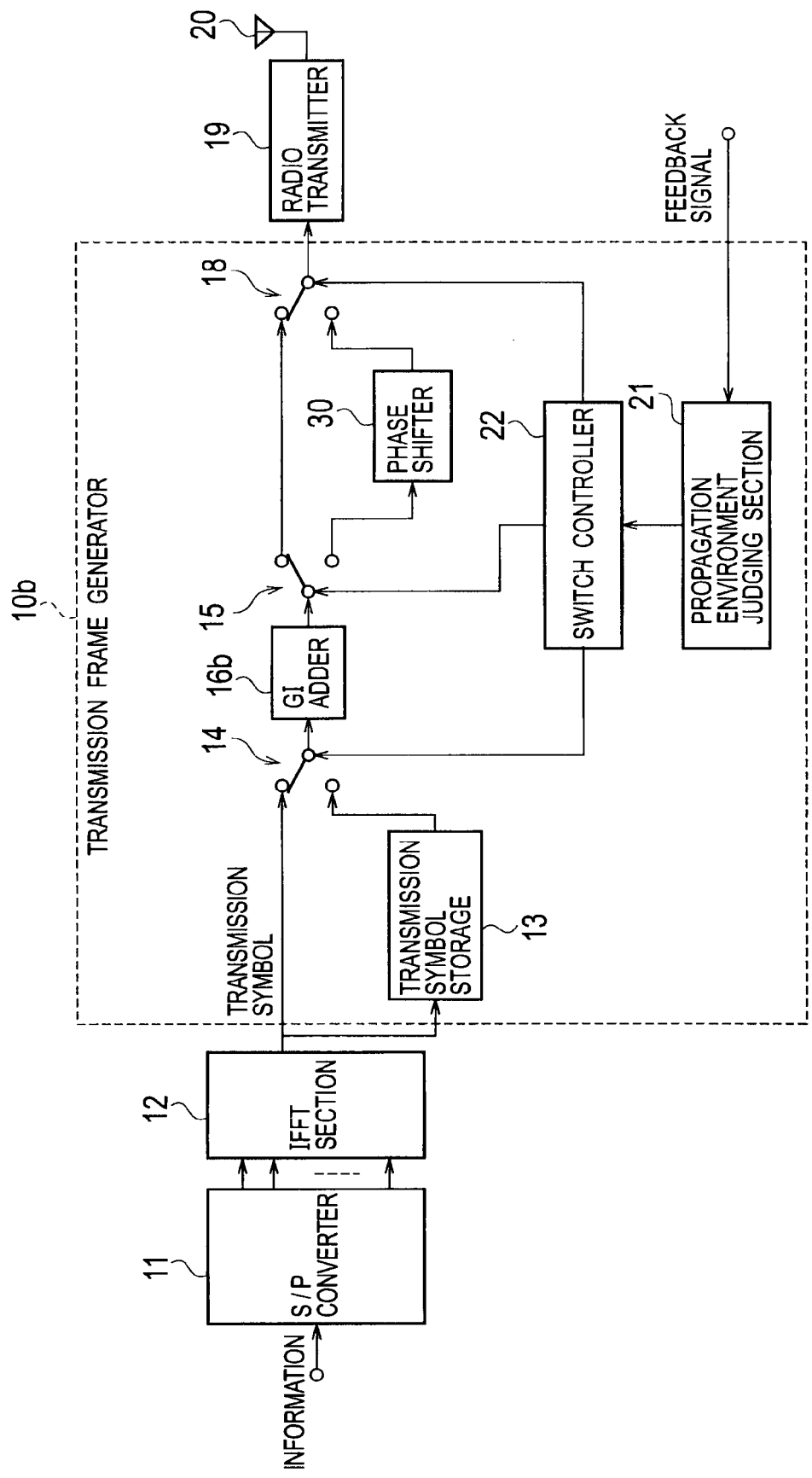
FIG. 8 is a functional block diagram showing a configuration example of a transmitter according to a second embodiment of the present invention.

Descriptions will be given of a configuration example of a transmitter according to the embodiment. FIG. 8 is a functional block diagram showing a configuration example of the transmitter according to the embodiment.

The transmitter according to the embodiment is different from that of the first embodiment in the respect that a GI adder 16b is connected between the first switch 14 and the second switch 15 in a transmission frame generator 10b. The GI adder 16b generates GIs for odd- and even-numbered transmission symbols, and adds the generated GIs to the odd- and even-numbered transmission symbols.

Furthermore, the transmitter according to the embodiment is different from that of the first embodiment in the respect that a phase shifter 30 is connected between the second switch 15 and the third switch 18. The phase shifter 30 shifts the phases of the even-numbered transmission symbol and a GI thereof such that the phases of the even-numbered transmission symbol and the GI thereof are continuous with those of the odd-numbered transmission symbol and a GI thereof after the GIs are added by the GI adder 16b.

(Method for Configuring Transmission Frame)

Figure 9:
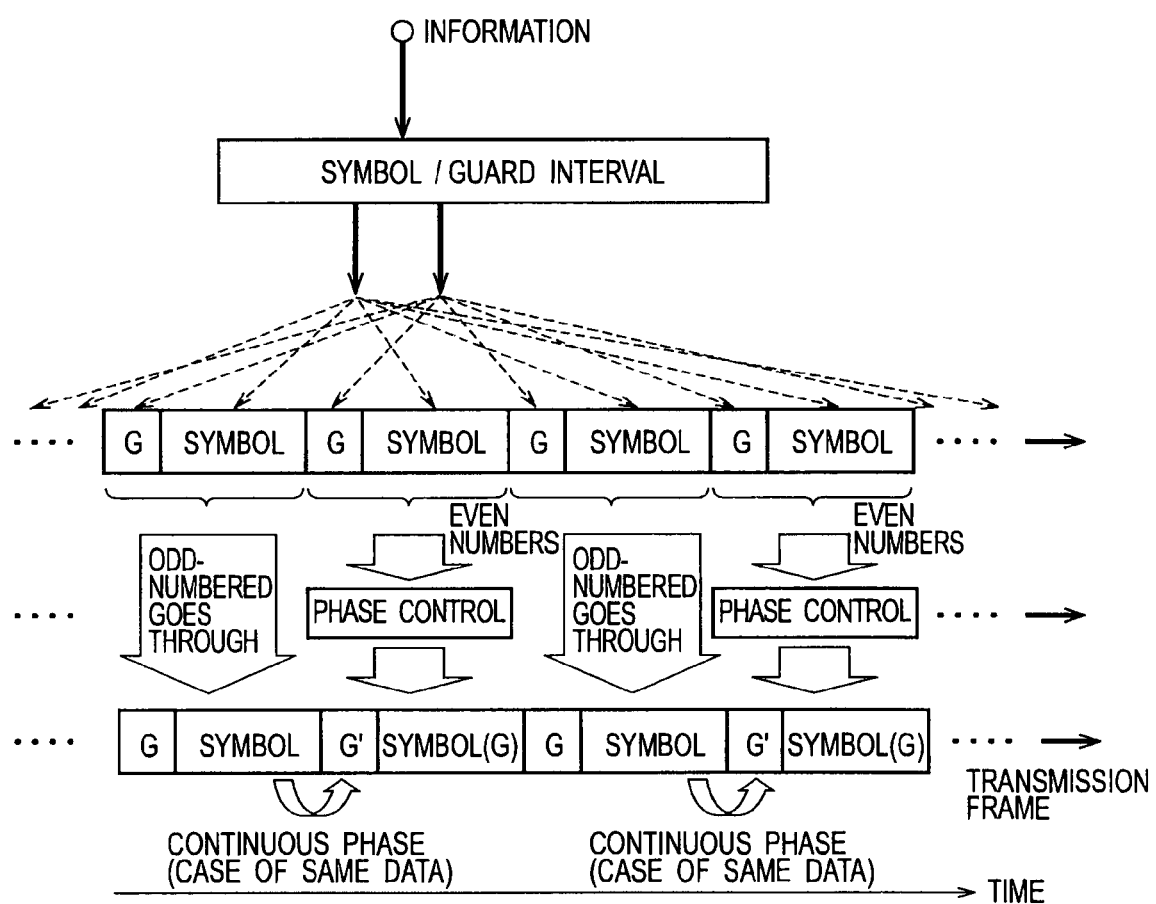
FIG. 9 is a view showing a frame configuration example in first and second modes of the transmitter according to the second embodiment of the present invention.

Next, descriptions will be given of a frame configuration method according to the embodiment. The frame configuration method according to the embodiment eventually has a frame configuration with that in the configuration shown in FIG. 2. However, the implementation is different from the first embodiment. FIG. 9 is a view showing the frame configuration method according to the embodiment.

In the frame configuration method according to the embodiment, GIs are added to immediately before odd- and even-numbered transmission symbols, and outputs the odd-numbered transmission symbols and the GIs thereof as they are, and outputs the even-numbered transmission symbols and the GIs thereof after shifting the phases by a fixed amount. The amount of shifting the phase is previously set such that the phase of the odd-numbered transmission symbol is continuous with the phase of the subsequent (even-numbered) GI when the odd-numbered transmission symbol is the same as the even-numbered transmission symbol.

(Operational Example of Transmission Frame Generator in First Transmission Mode)

Figure 10:
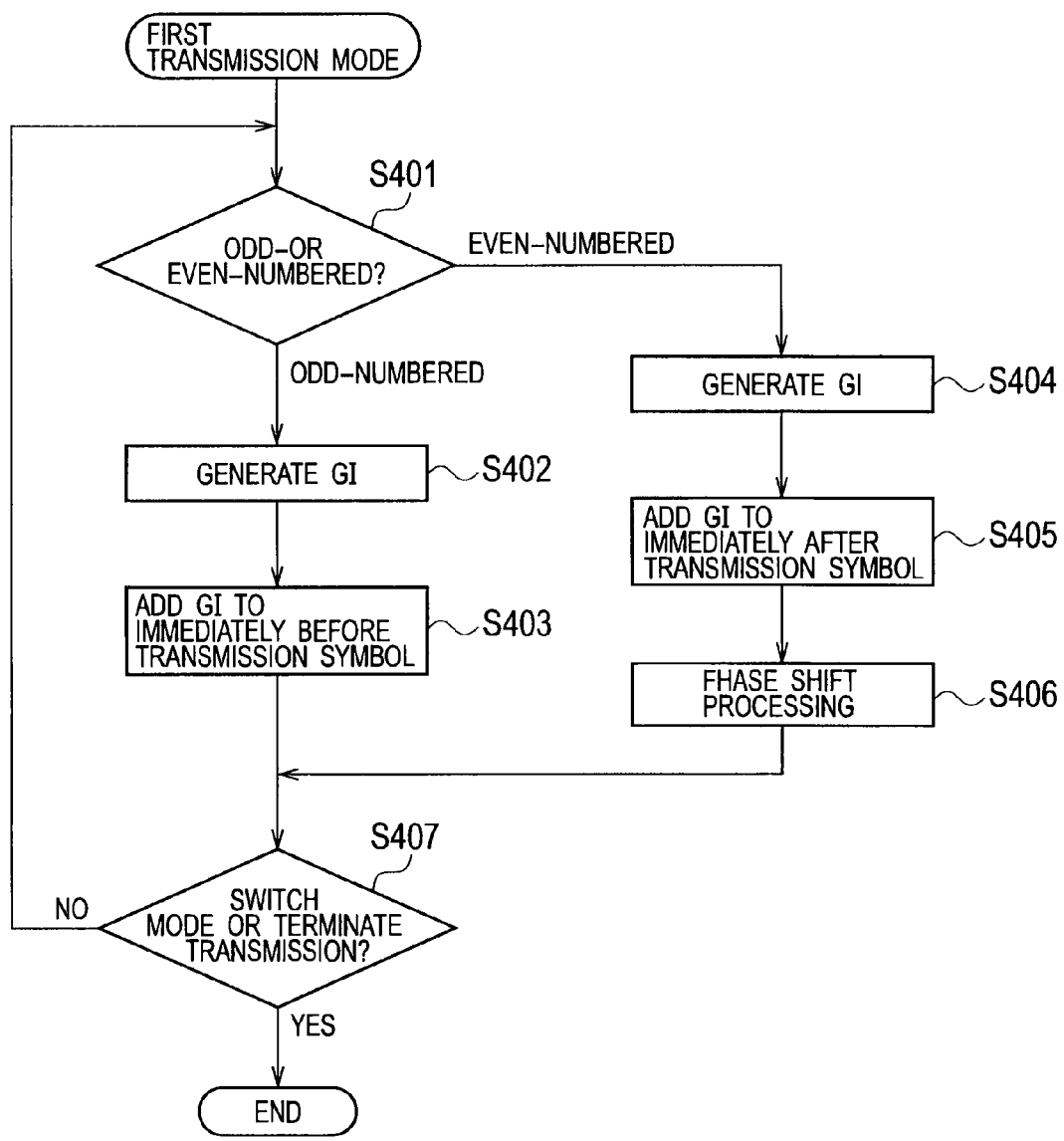
FIG. 10 is a flow chart showing an operational example in the first transmission mode of a transmission frame generator according to the second embodiment of the present invention.

Next, descriptions will be given of an operational example in the first transmission mode in the transmission frame generator 10b according to the embodiment. FIG. 10 is a flow chart showing an operational example in the first transmission mode in the transmission frame generator 10b according to the embodiment.

In Step S401, the switch controller 22 judges whether a transmission symbol is odd- or even-numbered. When the transmission symbol is odd-numbered, the processing goes to Step S402. On the other hand, when the transmission symbol is even-numbered, the processing goes to Step S404.

In Step S402, the GI adder 16b generates a GI by replicating the last fixed time period of the odd-numbered transmission symbol. In Step S403, the GI generated in Step S402 is added to immediately before the odd-numbered transmission symbol.

In Step S404, the GI adder 16b generates a GI by replicating the last fixed time period of the even-numbered transmission symbol. In Step S405, the GI adder 16b adds the GI generated in Step S404 to immediately before the even-numbered transmission symbol. In Step S406, the phase shifter 30 shifts the phases of the even-numbered transmission symbol and the GI thereof by the fixed amount.

In Step S407, the switch controller 22 judges whether to switch the mode or terminate the transmission. When the mode is switched or the transmission is terminated, the first transmission mode is terminated. On the other hand, when the mode is not switched or the transmission is not terminated, the processing goes back to Step S401.

(Operational Example of Transmission Frame Generator in Second Transmission Mode)

Figure 11:
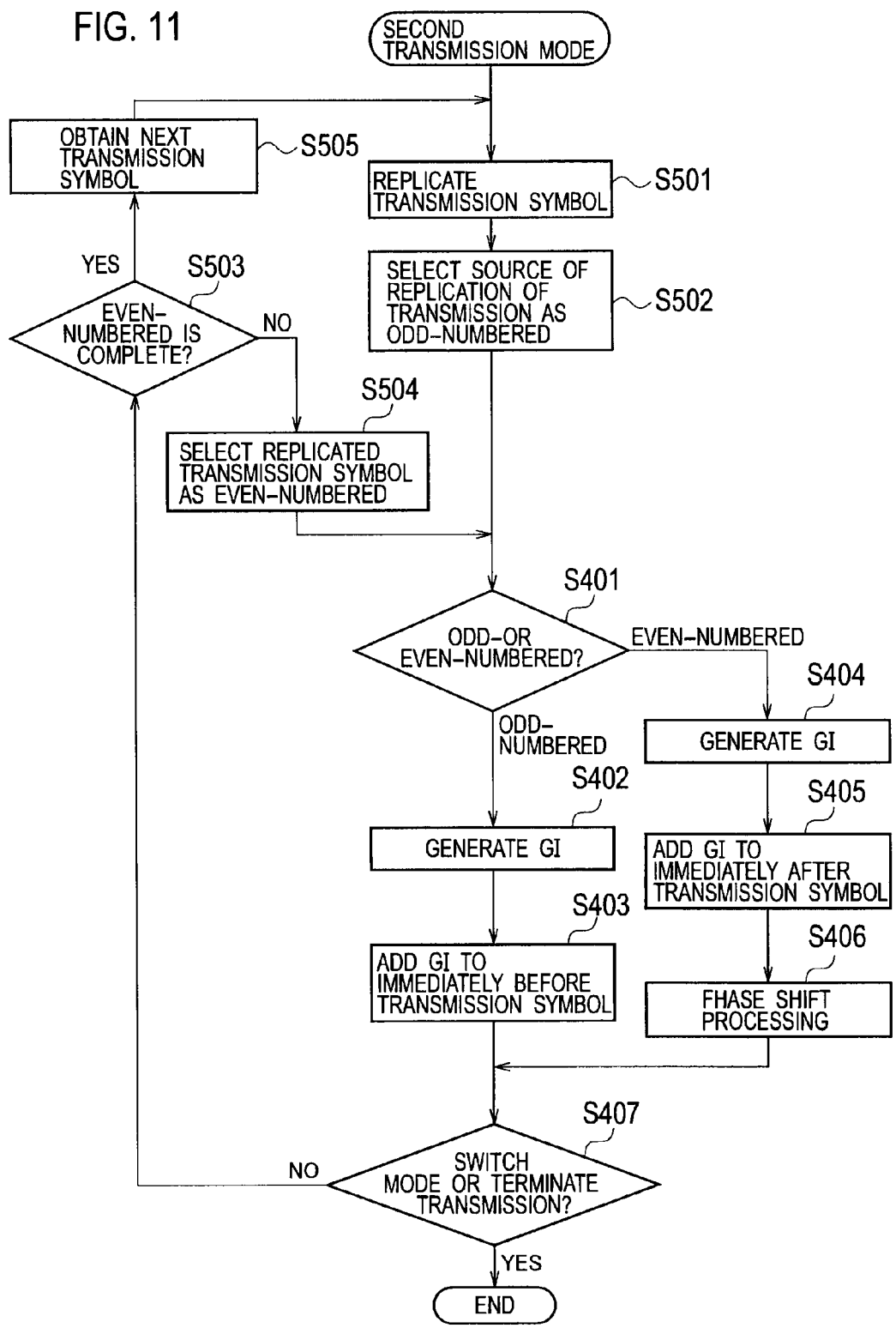
FIG. 11 is a flow chart showing an operational example in the second transmission mode of the transmission frame generator according to the second embodiment of the present invention.

Next, descriptions will be given of an operational example in the second transmission mode in the transmission frame generator 10b according to the embodiment. However, the overlapped descriptions will be omitted of the same operations as those in the first transmission mode. FIG. 11 is a flow chart showing an operational example in the second transmission mode of the transmission frame generator 10b according to the embodiment.

In Step S501, the transmission symbol storage 13 stores a transmission symbol outputted by the IFFT section 12 and generates the replication of the transmission symbol.

In Step S502, the first switch 14 selects the transmission symbol of the source of the replication, that is, the transmission symbol outputted by the IFFT section 12, as an odd-numbered transmission symbol.

In Steps S401 to S407, the same operations as those in the first transmission mode are executed.

In Step S503, the switch controller 22 judges whether or not the processing for the even-numbered transmission symbol is complete. When the processing for the even-numbered transmission symbol is complete, the processing goes to Step S505. On the other hand, when the processing for the even-numbered transmission symbol is not complete, the processing goes to Step S504.

In Step S504, the first switch 14 selects the replication of the transmission symbol stored in the transmission symbol storage 13 as an even-numbered transmission symbol. When the replication of the transmission symbol stored in the transmission symbol storage 13 is selected as the even-numbered transmission symbol, the processing goes to Step S401.

In contrast, when the processing for the even-numbered transmission symbol is complete, the next transmission symbol outputted by the IFFT section 12 is obtained in Step S505, and then the processing goes back to Step S501.

(Actions and Effects)

According to the embodiment, as in the first embodiment, while the same transmission efficiency as a conventional one is maintained in the first transmission mode, the mode is switched to the second transmission mode when the propagation environment has deteriorated. The transmission efficiency halves in the second transmission mode, but it is possible to equivalently obtain a GI equivalent to a time length that two GIs and one transmission symbol are added and securely suppress the multipath influence.

THIRD EMBODIMENT

In descriptions of a third embodiment, the descriptions will be given mainly of points different from the first and second embodiments, and the overlapped descriptions will be omitted.

(Configuration Example of Transmitter)

Figure 12:
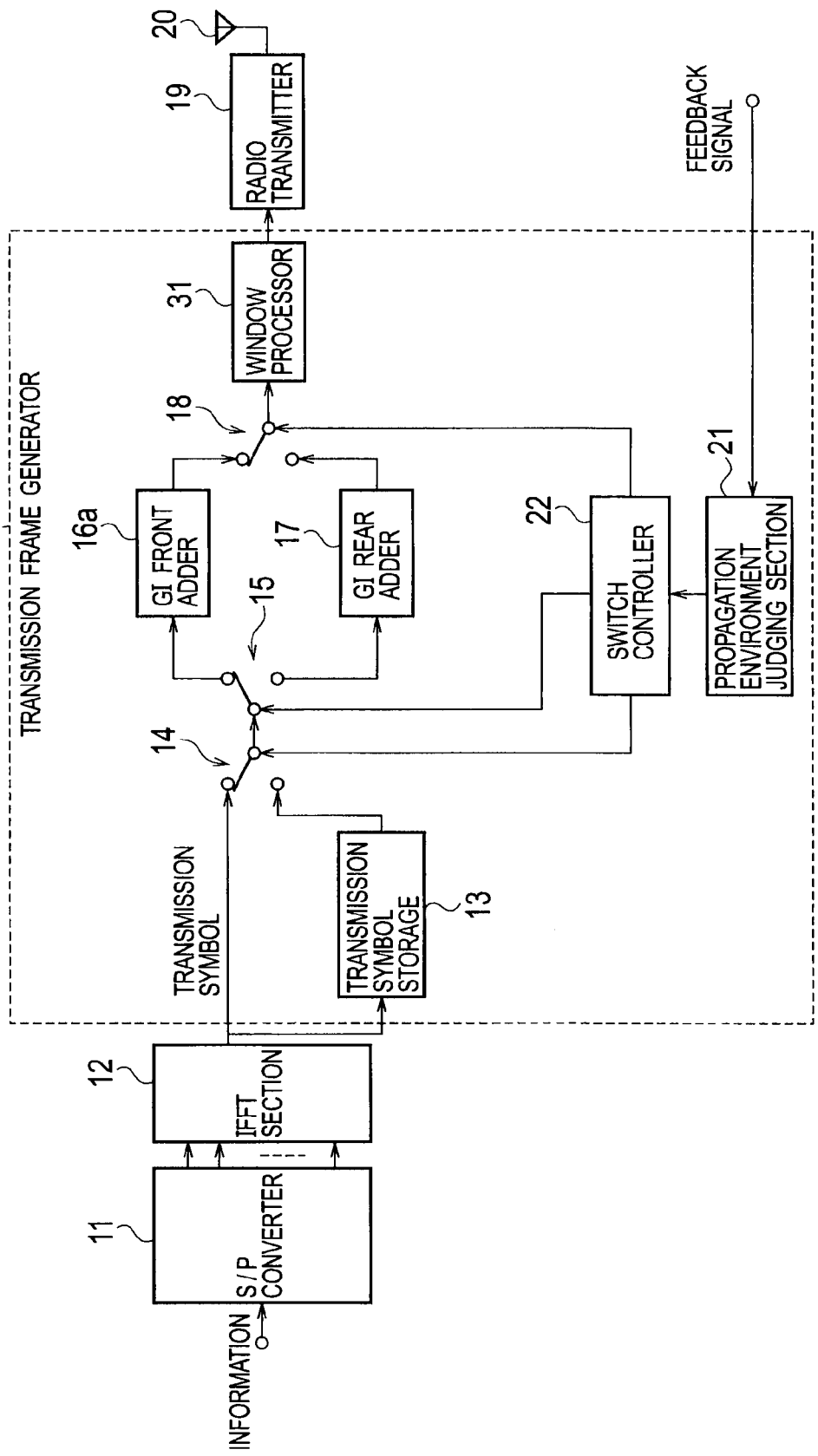
FIG. 12 is a functional block diagram showing a configuration example of a transmitter according to a third embodiment of the present invention.

FIG. 12 is a functional block diagram showing a configuration example of a transmitter according to the embodiment. A transmission frame generator 10c shown in FIG. 12 has a different configuration from the one shown in FIG. 3 in the respect that the transmission frame generator 10c has a window processor 31 which performs a window processing on the transmission unit outputted from the third switch 18.

In the OFDM method, with the discontinuity of signals between the transmission units (hereinafter referred to as "the OFDM symbol" where appropriate), adjacent channel leakage power increases. In order to avoid such adjacent channel leakage power, it is necessary to perform the window processing (windowing) which controls the amplitude of the OFDM symbol on the time axis.

Figure 13:
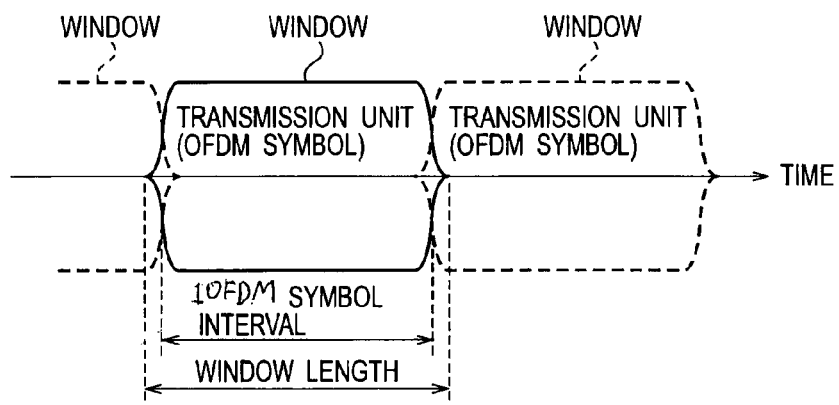
FIG. 13 is a view for explaining a summary of a window processing.

FIG. 13 is a view for explaining a summary of the window processing. Three windows are illustrated in FIG. 13. Each window is provided corresponding to one OFDM symbol interval, and is a window function of a time domain which smoothly boots and closes itself. In the window processor 31, each of the connected part of OFDM symbols is smoothly attenuated by multiplying the window shown in FIG. 13 by the OFDM symbol.

On the other hand, when a part on which the window processing has been performed at the transmitting end is used for the detecting process of a received signal, it leads to the deterioration of the reception quality (such as a bit error rate and a frame error rate) at the receiving end. Hence, the part on which the window processing has been performed at the transmitting end is abandoned at the receiving end together with an excess guard interval.

In the above-mentioned first and second embodiments, two transmission units (OFDM symbols) having continuous phases are generated. Therefore, in this embodiment, the window processor 31 judges whether or not to execute the window processing in accordance with whether or not the phases of the two transmission units (OFDM symbols) are continuous as shown in FIG. 14.

(Detailed Descriptions of Window Processing)

Figure 14:
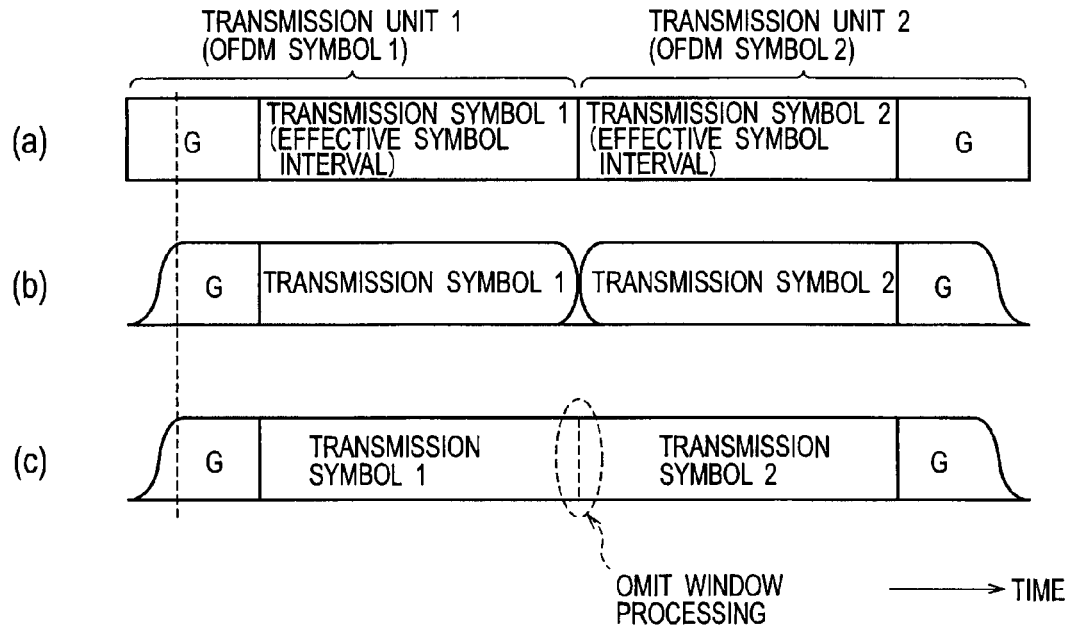
FIG. 14 is a view for explaining the details of the window processing executed by a window processor according to the third embodiment of the present invention.

FIG. 14 is a view for explaining the details of the window processing executed by the window processor 31.

FIG. 14 (*a*) shows two OFDM symbols having continuous phases. Each OFDM symbol has a transmission symbol (an effective symbol interval) and a GI.

In a conventional window processing, the head and end parts of each OFDM symbol attenuate smoothly as shown in FIG. 14 (*b*).

On the other hand, the window processor 31 according to the embodiment omits the window processing for the connected part of two transmission units (OFDM symbols) having continuous phases, as shown in FIG. 14 (*c*). Accordingly, the deterioration of the reception quality is not caused at the receiving end even if the FFT is performed straddling the connected part of the OFDM symbols.

Figure 15:
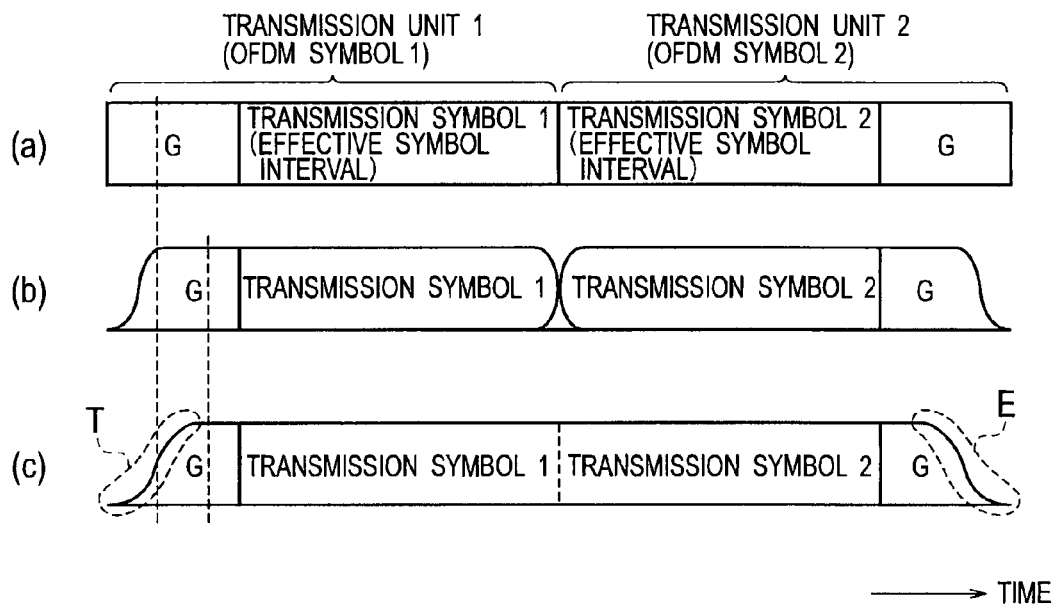
FIG. 15 is a view for explaining another example of the window processing executed by the window processor according to the third embodiment of the present invention.

FIG. 15 is a view for explaining another example of the window processing executed by the window processor 31. Here, descriptions will be given of an example of performing the window processing by use of a window (window function) whose window length is long as well as omitting the window processing for the connected part of two transmission units (OFDM symbols) having continuous phases.

FIGS. 15 (*a*) and 15 (*b*) are the same as FIGS. 14 (*a*) and 14 (*b*). FIG. 15 (*c*) shows a case where the window processing is performed by use of a window whose window length is long.

In a conventional window processing, a window corresponding to one OFDM symbol interval is used as shown in FIG. 13. On the other hand, the window processor 31 according to the embodiment uses a window corresponding to two OFDM symbol intervals.

Consequently, as shown in FIG. 15 (*c*), a top part (T) of an OFDM symbol 1 and an end part (E) of an OFDM symbol 2 are more smoothly attenuated than in FIG. 15 (*b*). Such an attenuation characteristic can be realized by, in the window processor 31, calculating a window coefficient by use of an appropriate window function and applying the calculated window coefficient. The effect of reducing adjacent channel leakage power is enhanced by performing such a process.

(Actions and Effects)

According to the embodiment, the transmission frame generator 10*c* has the window processor 31 which executes the window processing in which the head and end parts, on the time axis, of an OFDM symbol (transmission unit) composed of an effective symbol interval (transmission symbol) and a GI are attenuated. The window processor 31 omits the window processing for the connected part of two OFDM symbols having continuous phases.

Therefore, it is possible at the receiving end to more securely perform the FFT straddling the connected part of two OFDM symbols having continuous phases.

According to the embodiment, the window processor 31 executes: a first window processing in which the head and end parts, on the time axis, of an OFDM symbol whose phase is not continuous with the phases of the preceding and subsequent OFDM symbols are attenuated; and a second window processing in which the head and end parts, on the time axis, of two OFDM symbols having continuous phases are attenuated. A window length applied to the second window processing is longer than a window length applied to the first window processing.

Hence, when performing the second window processing, it is possible to decrease the amount of out-of-band emission more than when performing the first window processing.

Please note that as described in the first and second embodiments, two OFDM symbols having continuous phases are generated when the propagation environment is bad. On the other hand, an OFDM symbol whose phase is not continuous with the phases of the preceding and subsequent OFDM symbols is generated when the propagation environment is good.

Here, the bad propagation environment indicates that the length of an impulse response of a channel is long (especially compared with a GI length). Moreover, a matter of which window length is used may be decided by a condition that an adjacent frequency is used in the surroundings, transmission power, and an installation condition.

Accordingly, when the propagation environment is bad, for example, in the outdoor radio communications, since the transmission power is high, it is extremely effective that a long window length is applied. When the propagation environment is good, for example, in the indoor radio communications, since the transmission power is low, there is no problem in use of a short window length.

FOURTH EMBODIMENT

In descriptions of a fourth embodiment, the descriptions will be given mainly of points different from the first to third embodiments, and the overlapped descriptions will be omitted.

(Configuration Example of Radio Communication System)

Figure 16:
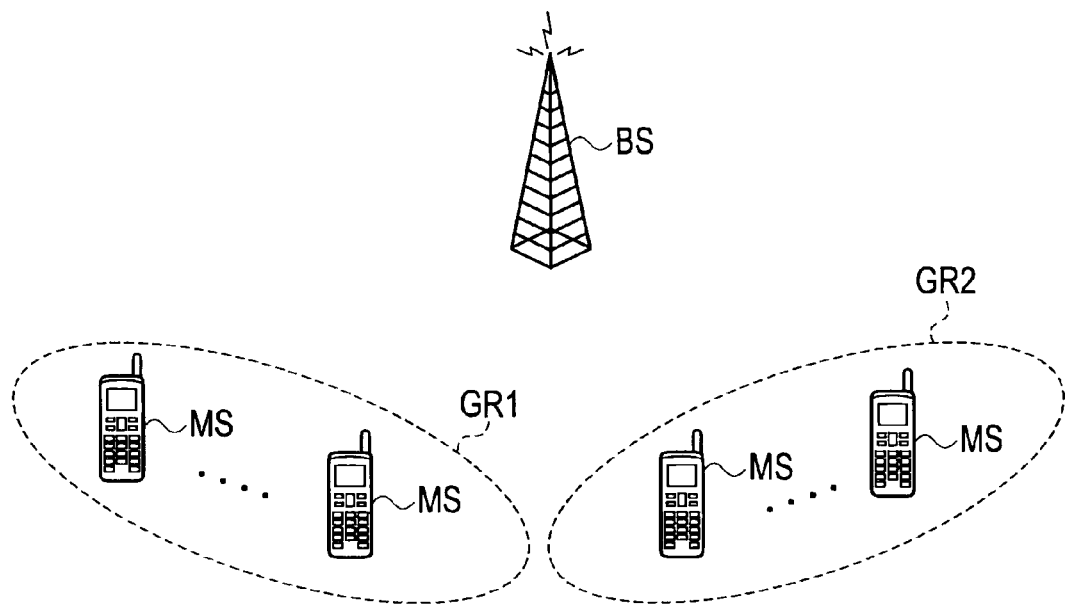
FIG. 16 is a schematic block diagram of a radio communication system according to a fourth embodiment of the present invention.

FIG. 16 is a schematic block diagram of a radio communication system according to the embodiment. The radio communication system according to the embodiment is a radio communication system to which the OFDMA method is applied (for example, a radio communication system based on IEEE 802.16e (WiMAX)). In the OFDMA method, a base station BS dynamically allocates a sub-channel (a communication channel) composed of multiple subcarriers to a mobile station MS, and simultaneously communicates with multiple mobile stations MS.

In the embodiment, descriptions will be given of a configuration in which the transmission method according to the above-mentioned first to third embodiments (hereinafter referred to as "repeat transmission" where appropriate) is applied to only a part of mobile stations MS, and a conventional transmission frame configuration method is applied to the other mobile stations MS. Descriptions will hereinafter be given of a case where the repeat transmission is performed at the base station BS.

The base station BS allocates at least one subcarrier to each of the mobile stations MS. In the embodiment, the base station BS categorizes the mobile stations MS into: a first group GR1 composed of the mobile stations MS which are targeted for the repeat transmission; and a second group GR2 composed of the mobile stations MS which are not targeted for the repeat transmission.

Figure 17:
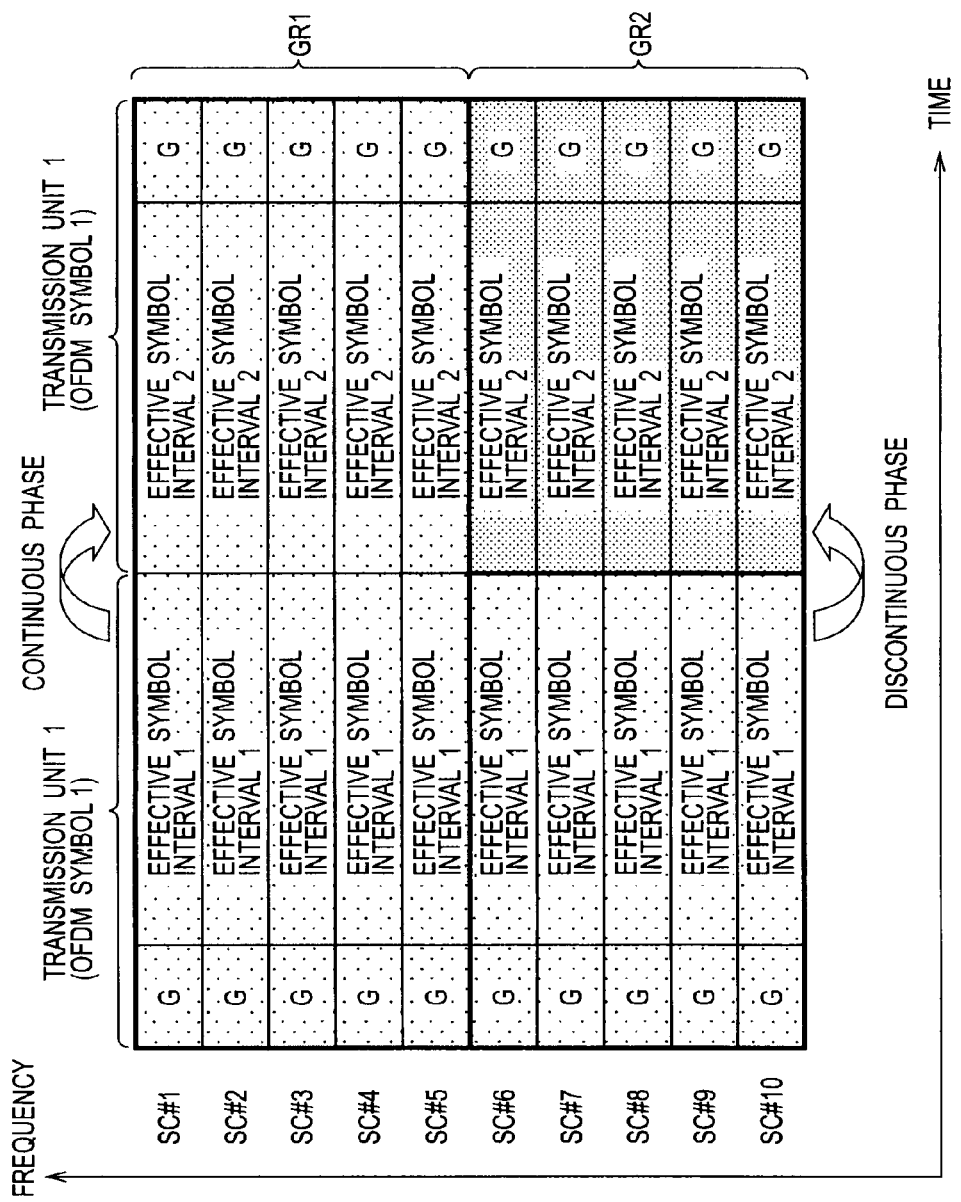
FIG. 17 is a partial block diagram of a communication frame used in the radio communication system according to the fourth embodiment of the present invention.

FIG. 17 is a partial block diagram of the communication frame used in the radio communication system shown in FIG. 16. Specifically, FIG. 17 shows a partial configuration of a downlink subframe (DL subframe).

In FIG. 17, subcarriers SC#1 to SC#5 correspond to the first group GR1, and subcarriers SC#6 to SC#10 correspond to the second group GR10. In other words, the subcarriers SC#1 to SC#5 are allocated to the mobile stations MS belonging to the first group GR1. The subcarriers SC#6 to SC#10 are allocated to the mobile stations MS belonging to the second group GR2.

(Configuration Example of Transmitter)

Figure 18:
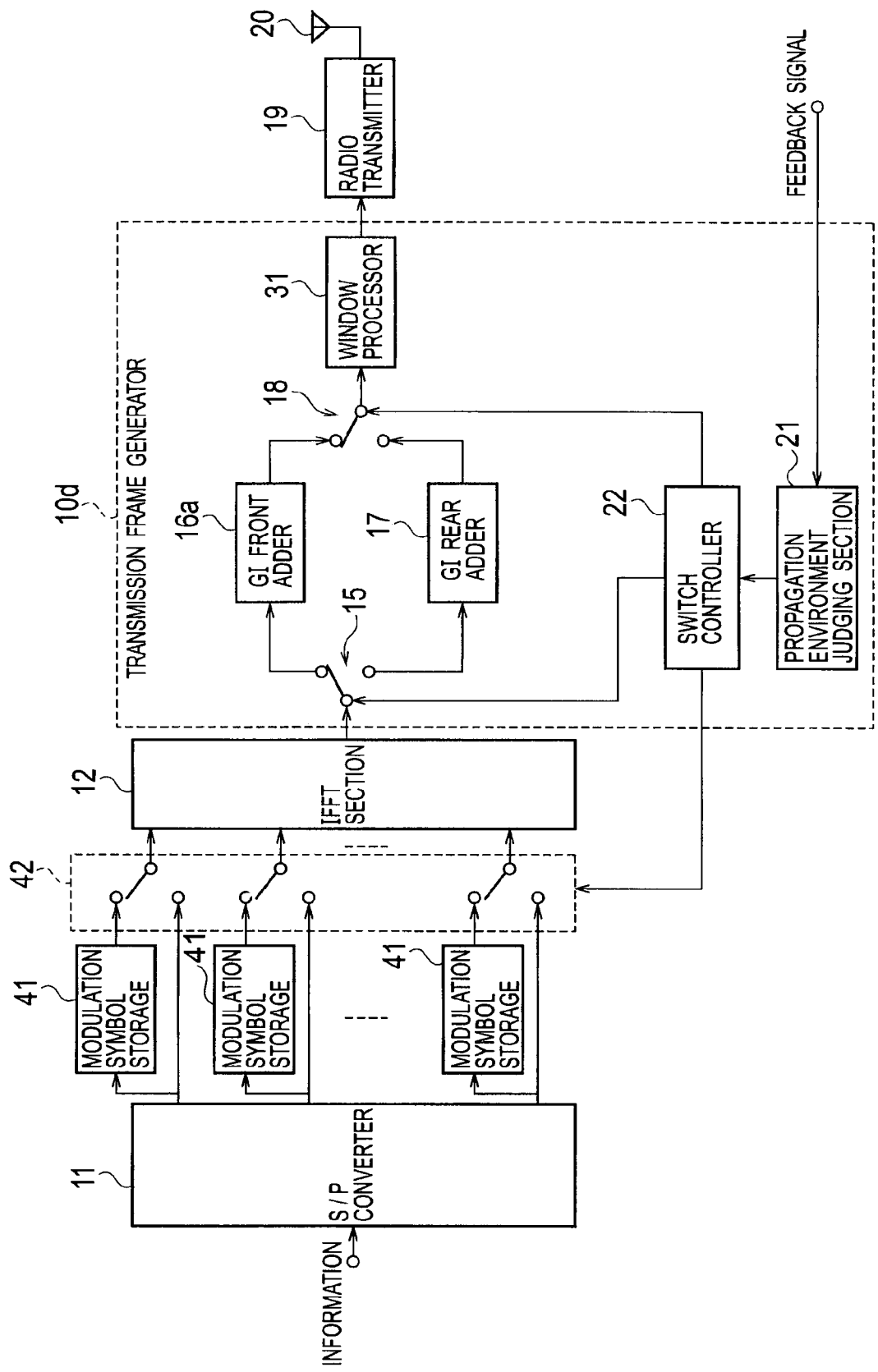
FIG. 18 is a functional block diagram showing a configuration example of a transmitter according to the fourth embodiment of the present invention.

FIG. 18 is a functional block diagram showing a configuration example of a transmitter according to the embodiment. The transmitter shown in FIG. 18 is provided for the base station BS.

The transmitter shown in FIG. 18 is different from the one in FIG. 12 in the respect that the transmitter has a modulation symbol storage 41 and a modulation symbol selector 42. Furthermore, in the transmitter shown in FIG. 18, a transmission frame generator 10d does not have the transmission symbol storage 13 shown in FIG. 12.

In the embodiment, the S/P converter 11 functions as a modulation symbol generator which generates a modulation symbol corresponding to each subcarrier, by modulating and serially/parallel converting information to be transmitted to the mobile station MS. Moreover, the S/P converter 11 allocates at least one subcarrier to the mobile station MS.

The modulation symbol storage 41 stores the modulation symbol generated by the S/P converter 11. The modulation symbol selector 42 selects any one of the modulation symbol generated by the S/P converter 11 and the modulation symbol stored by the modulation symbol storage 41, under the control of the switch controller 22.

In the embodiment, the IFFT section 12 functions as a generator which generates a transmission symbol by implementing the inverse Fourier transform or the serial/parallel conversion on the modulation symbol selected by the modulation symbol selector 42.

With such a configuration of the transmitter, the S/P converter 11 generates the modulation symbol corresponding to each subcarrier. The modulation symbol selector 42 selects any one of the modulation symbol generated by the S/P converter 11 and the modulation symbol stored by the modulation symbol storage 41. In other words, it is possible to decide the mobile stations MS which perform the repeat transmission and mobile the stations MS which do not perform the repeat transmission, on the frequency axis.

(Reception Method)

In the configuration of the transmitter according to the embodiment, since the window processing is performed on the transmission unit (OFDM symbol) after multiplexing each subcarrier, it is not possible to omit the window processing described in the third embodiment. Therefore, the following reception method is applied at the receiving end (the mobile station MS).

Figure 19:
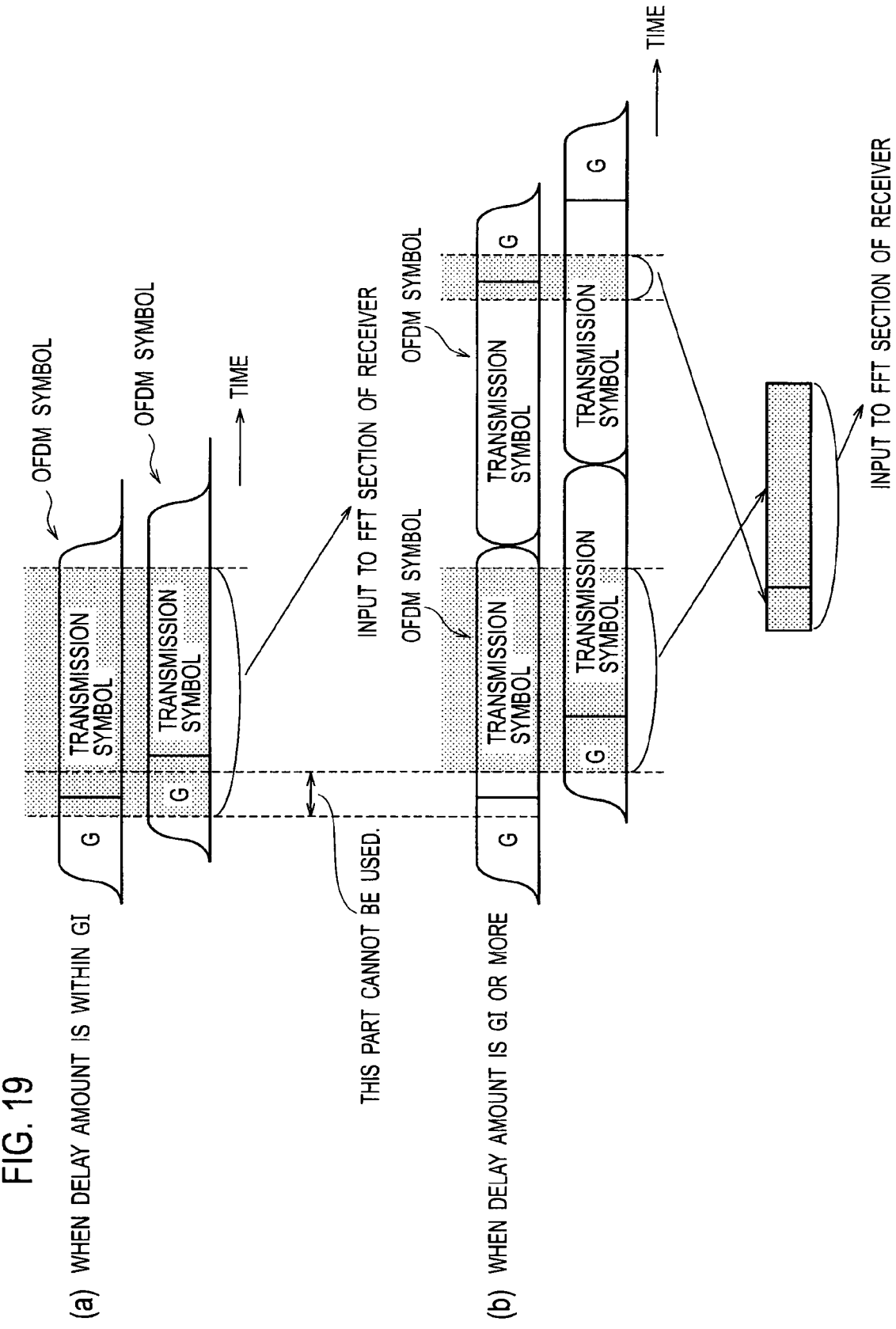
FIG. 19 is an operation explanatory view showing operations in which the FFT is performed on an OFDM symbol received from the transmitter according to the embodiment at the receiving end (Number 1).

FIG. 19 is an operation explanatory view showing operations in which the FFT is performed on an OFDM symbol received from the transmitter (the base station BS) according to the embodiment.

An OFDM symbol in the top of FIG. 19 (a) is an OFDM symbol corresponding to an advancing wave, and an OFDM symbol in the bottom of FIG. 19 (a) is an OFDM symbol corresponding to a delayed wave. In FIG. 19 (a), the normal FFT is applied since the delay amount is within a guard interval.

On the other hand, in FIG. 19 (b), since the delay mount exceeds a guard interval, the normal FFT cannot be applied. In such a case, the FFT can be executable by combining a part of the former part of an OFDM symbol and a part of the latter part of an OFDM symbol.

(Transmission and Reception Methods)

When the window processing cannot be omitted and a window whose roll-off rate is large as described in the third embodiment is used, if the delay amount exceeds a fixed amount, it is not possible to apply the reception method as in FIG. 19 (b).

Figure 20:
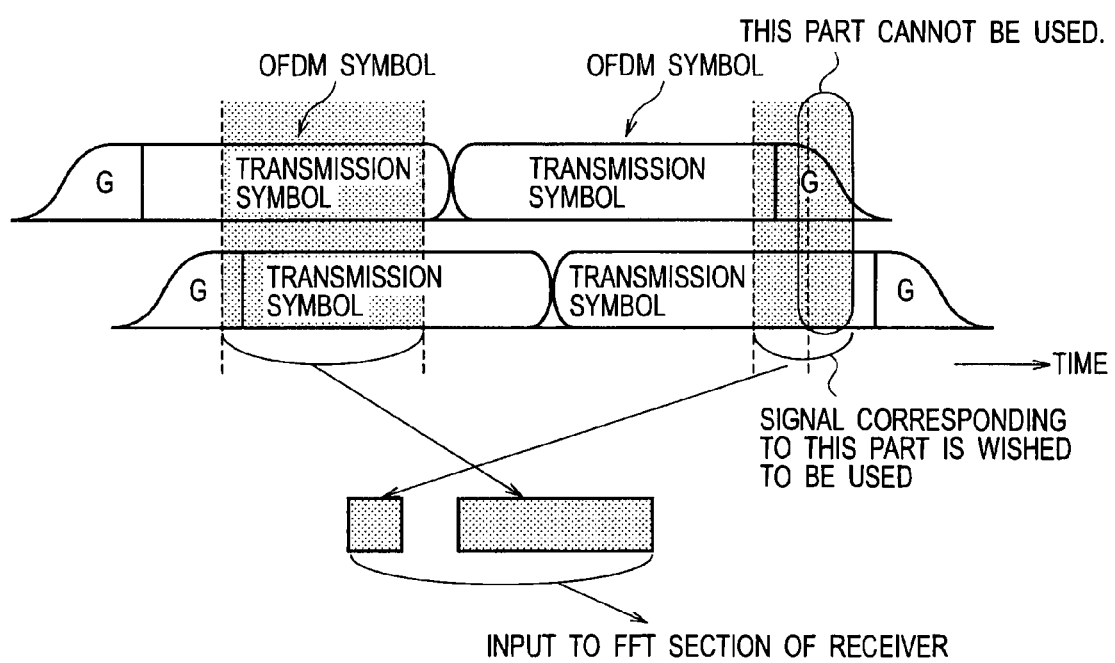
FIG. 20 is an operation explanatory view showing operations in which the FFT is performed on an OFDM symbol received from the transmitter according to the embodiment at the receiving end (Number 2).

Specifically, as shown in FIG. 20, since a part on which the window processing is performed can be used for the FFT, it is made impossible to extract a part of the latter part of an OFDM symbol. In order to avoid such trouble, it is better to apply a transmission method shown in FIG. 21.

Figure 21:
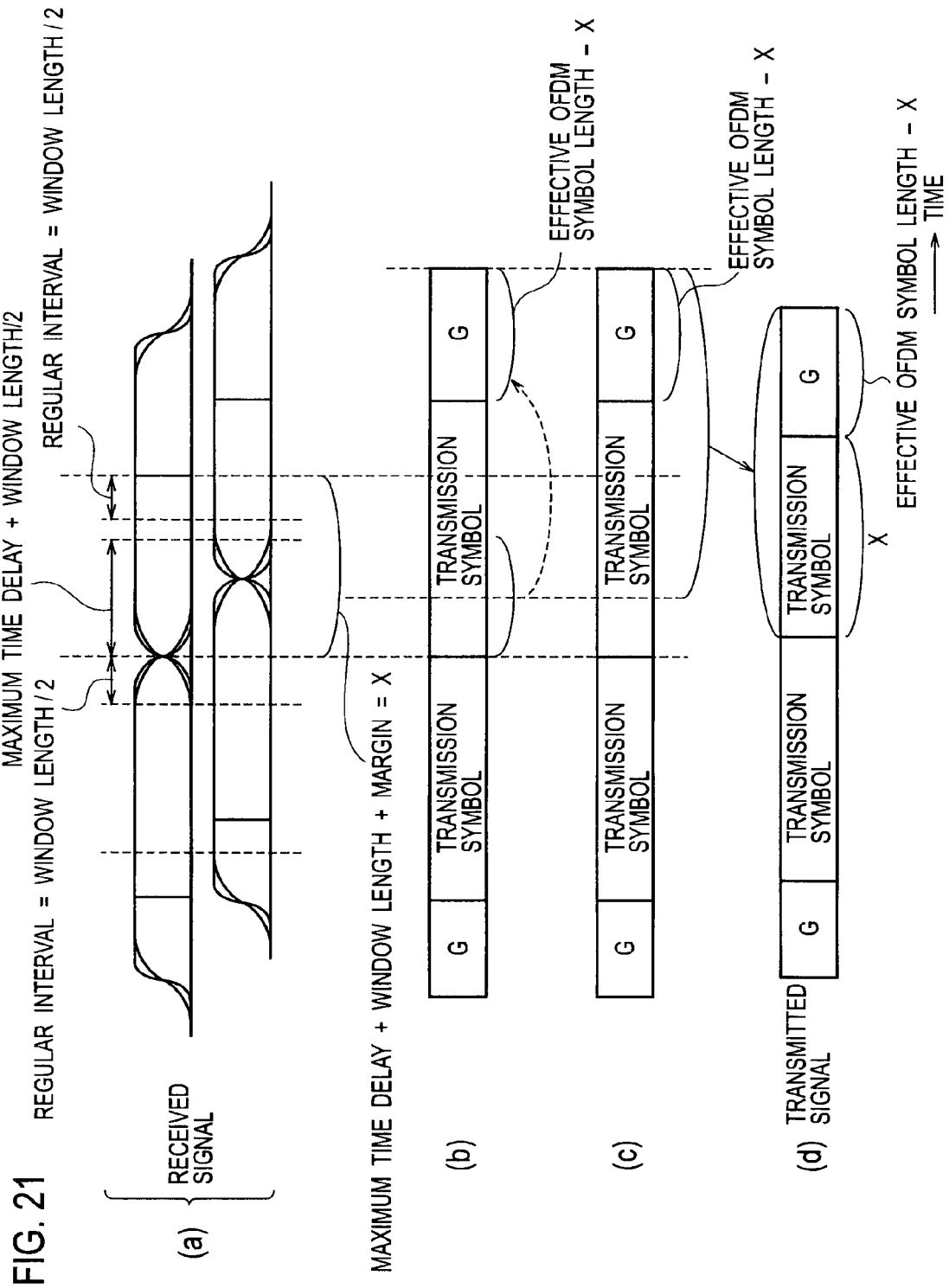
FIG. 21 is a view showing a transmission method applied to the transmitter according to the fourth embodiment of the present invention.

FIG. 21 is a view showing a transmission method applied to the transmitter according to the embodiment. As shown in FIGS. 21 (c) and 21 (d), it is possible to resolve the above trouble by shifting a connected part of a transmission symbol (an effective symbol interval) and a GI, which compose the latter part of an OFDM symbol, forward on the time axis.

(Actions and Effects)

According to the embodiment, the base station BS communicates with multiple mobile stations MS by the OFDMA method. The transmitter provided for the base station BS has: the S/P converter 11 which allocates at least one subcarrier to each of the mobile stations MS; and the modulation symbol selector 42. The modulation symbol selector 42 categorizes each of the mobile stations MS into the first group GR1 or the second group GR2.

The transmission frame generator 10d generates an OFDM symbol whose phase is not continuous with the phases of the preceding and subsequent OFDM symbols for the mobile stations MS categorized into the first group GR1, and generates two OFDM symbols having continuous phases for the mobile stations MS categorized into the second group GR2.

Hence, when communicating with multiple mobile stations MS by the OFDMA method, it is made possible to select whether or not the repeat transmission is applied, for each mobile station.

According to the embodiment, the transmission frame generator 10d has the GI front adder 16a which adds a GI to immediately before an odd-numbered transmission symbol, the GI rear adder 17 which adds a GI to immediately after an even-numbered transmission symbol, and the window processor 31 which executes the window processing. The GI rear adder 17 shifts the connected part of a transmission symbol and a GI forward on the time axis.

Thus, even if the window processing cannot be omitted and a window whose roll-off rate is large as described in the third embodiment is used, it is possible to more securely execute the FFT at the receiving end (the mobile station MS).

FIFTH EMBODIMENT

In this embodiment, descriptions will be given of another configuration example of the transmitter described in the fourth embodiment.

(Configuration Example of Transmitter)

Figure 22:
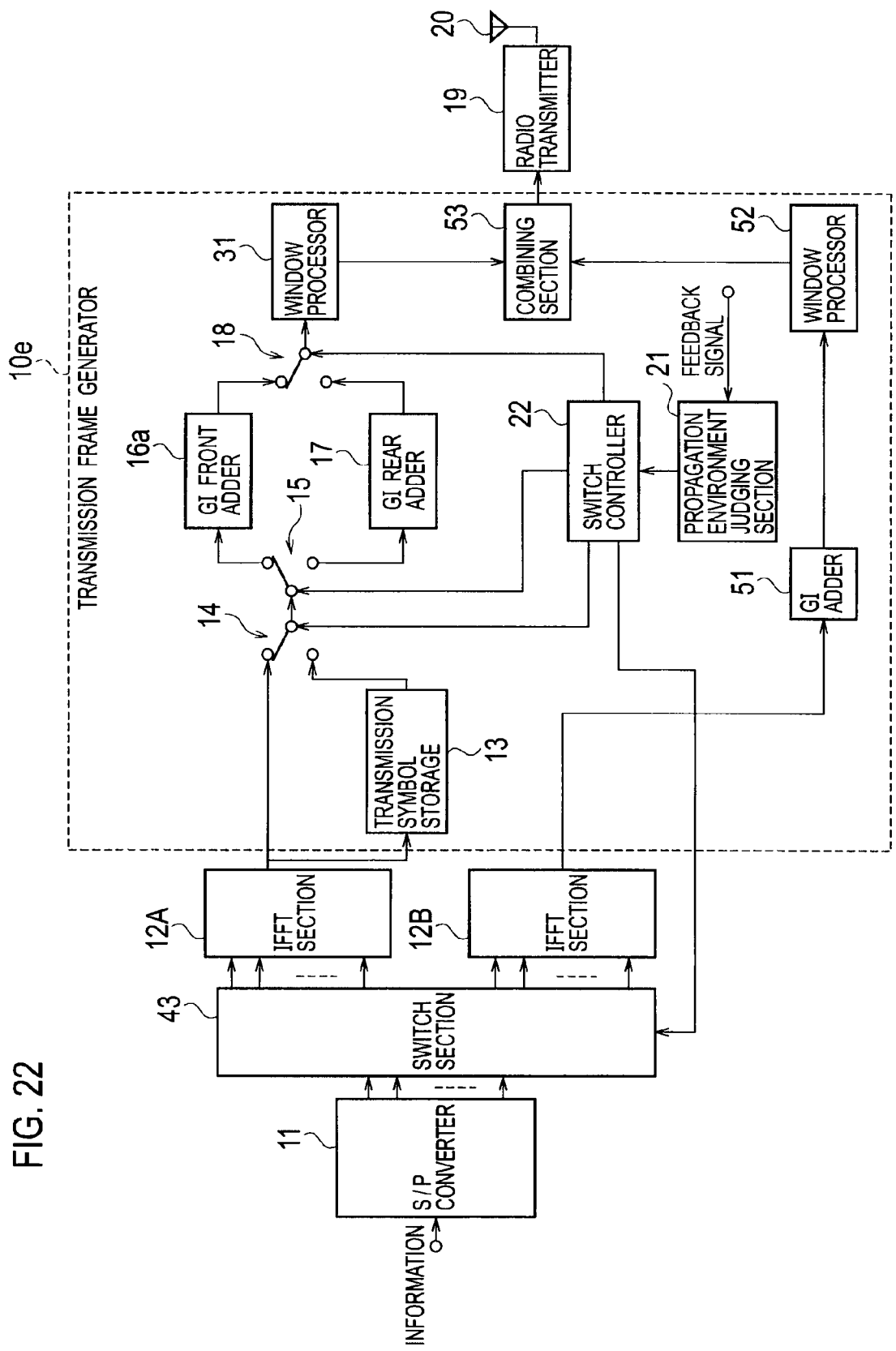
FIG. 22 is a functional block diagram showing a configuration example of a transmitter according to a fifth embodiment of the present invention.

FIG. 22 is a functional block diagram showing a configuration example of a transmitter according to the embodiment.

The transmitter shown in FIG. 22 has two IFFT sections 12A and 12B, and is provided with a switch 43 between the S/P converter 11 and the IFFT sections 12A and 12B.

The S/P converter 11, the switch 43, and the IFFT sections 12A and 12B function as transmission symbol generators which generate second transmission symbols for the mobile stations MS categorized into the second group GR2 as well as generate first transmission symbols for the mobile stations MS categorized into the first group GR1.

Specifically, the repeat transmission is applied to a transmission symbol outputted by the IFFT section 12A. On the other hand, the repeat transmission is not applied to a transmission symbol outputted by the IFFT 12B.

A transmission frame generator 10e is different from FIG. 12 in the respect that the transmission frame generator 10e further includes a GI adder 51, a window processor 52, and a combining section 53.

The GI adder 51 generates an OFDM symbol (a transmission unit) by adding a GI to the top of each transmission symbol, for example. The window processor 52 performs the window processing on the head and end of each OFDM symbol.

On the other hand, the window processor 31 uses a window whose roll-off rate is large as well as omits the window processing for the connected part of two OFDM symbols having continuous phases.

The combining section 53 combines the output of the window processor 31 and the output of the window processor 52.

(Actions and Effects)

According to the embodiment, since the window processing is separately performed on an OFDM symbol to which the repeat transmission is applied and an OFDM symbol to which the transmission symbol is not applied, it is possible to use both of the window processing appropriate to an OFDM symbol to which the repeat transmission is applied and the window processing appropriate to an OFDM symbol to which the transmission symbol is not applied.

OTHER EMBODIMENTS

Although the present invention has been described in the above by the embodiments, the descriptions and drawings, which are a part of the disclosure, should not be understood to limit the present invention. Various alternative embodiments, examples, and operation technologies are obvious for those skilled in the art from the disclosure.

For example, in the above-mentioned first embodiment, the descriptions have been given of the configuration in which a GI is added to immediately before an odd-numbered transmission symbol and a GI is added to immediately after an even-numbered transmission symbol, as shown in FIG. 4. However, in FIG. 4, there is no problem in a configuration in which an odd-numbered and an even-numbered are switched, that is, a GI is added to immediately is before an even-numbered transmission symbol, and a GI is added to immediately after an odd-numbered transmission symbol.

Furthermore, in the above-mentioned second embodiment, the descriptions have been given of the configuration in which the phases of an even-numbered transmission symbol and a GI thereof shift such that the phases of an even-numbered transmission symbol and a GI thereof are continuous with the phases of an odd-numbered transmission symbol and a GI thereof, as shown in FIG. 9. However, in FIG. 9, there is no problem in a configuration in which an odd-numbered and an even-numbered are switched, that is, the phases of an odd-numbered transmission symbol and a GI thereof shift such that the phases of an odd-numbered transmission symbol and a GI thereof are continuous with the phases of an even-numbered transmission symbol and a GI thereof.

Moreover, in the above-mentioned embodiments, the descriptions have been given of the configuration in which an odd-numbered transmission symbol is the same as an even-numbered transmission symbol by replicating a transmission symbol outputted by the IFFT section 12 in the second mode. However, the configuration may be one in which an input signal to the IFFT section 12, an input signal (information) to the S/P converter 11, and the like are replicated.

Please note that although the descriptions have been given of the case of using the OFDM method in the above-mentioned embodiments, the method is not limited to this. The present invention may be applied to other multicarrier methods.

In the above-mentioned fourth and fifth embodiments, although the descriptions have been given of the configuration in which the base station BS performs the repeat transmission, it is naturally applicable to the mobile stations MS.

Figure 23:
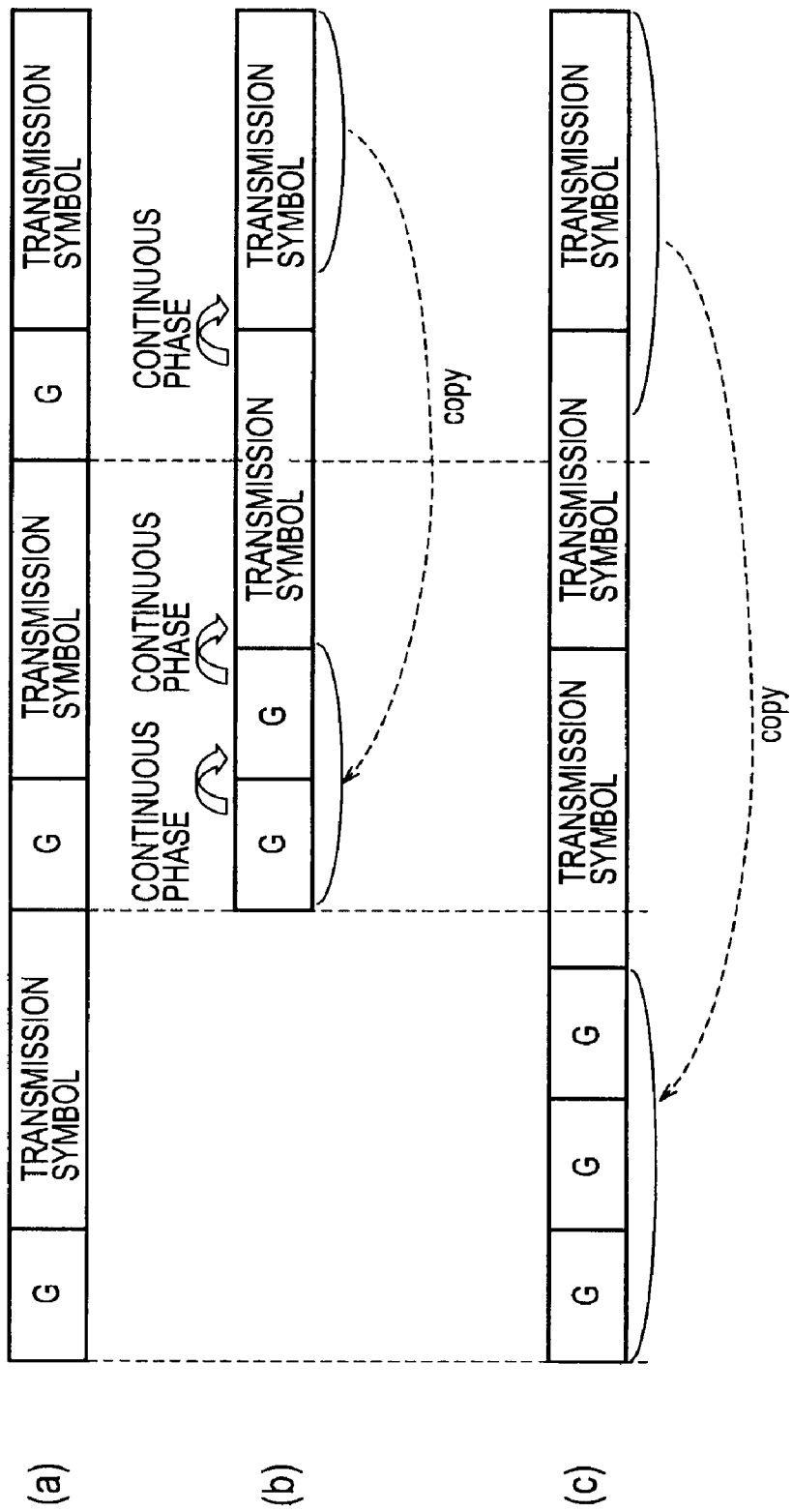
FIG. 23 is a view showing a method for configuring a transmission frame according to another embodiment.

In the above-mentioned first to fifth embodiments, the descriptions have been given of the configuration in which two OFDM symbols having continuous phases are transmitted. However, three or more OFDM symbols having continuous phases may be transmitted. FIG. 23 is a view showing a method for configuring a transmission frame according to other embodiments. FIG. 23 (a) shows a method for configuring a conventional transmission frame in which each transmission symbol is different.

As shown in FIG. 23 (b), in terms of two of the same continuous transmission symbols, a transmitter may make the phases of one transmission symbol and a guard interval thereof continuous with the phases of the other transmission symbol and a guard interval thereof. Moreover, as shown in FIG. 23 (c), the same processing may be performed on three of the same transmission symbols.

In the above-mentioned fourth and fifth embodiments, as shown in FIG. 17, a communication frame (a transmission frame) is divided into multiple communication channels (subcarriers or sub-channels) only in the frequency direction. However, as shown in FIG. 24, a communication frame may be divided into the time direction and the frequency direction.

Figure 24:
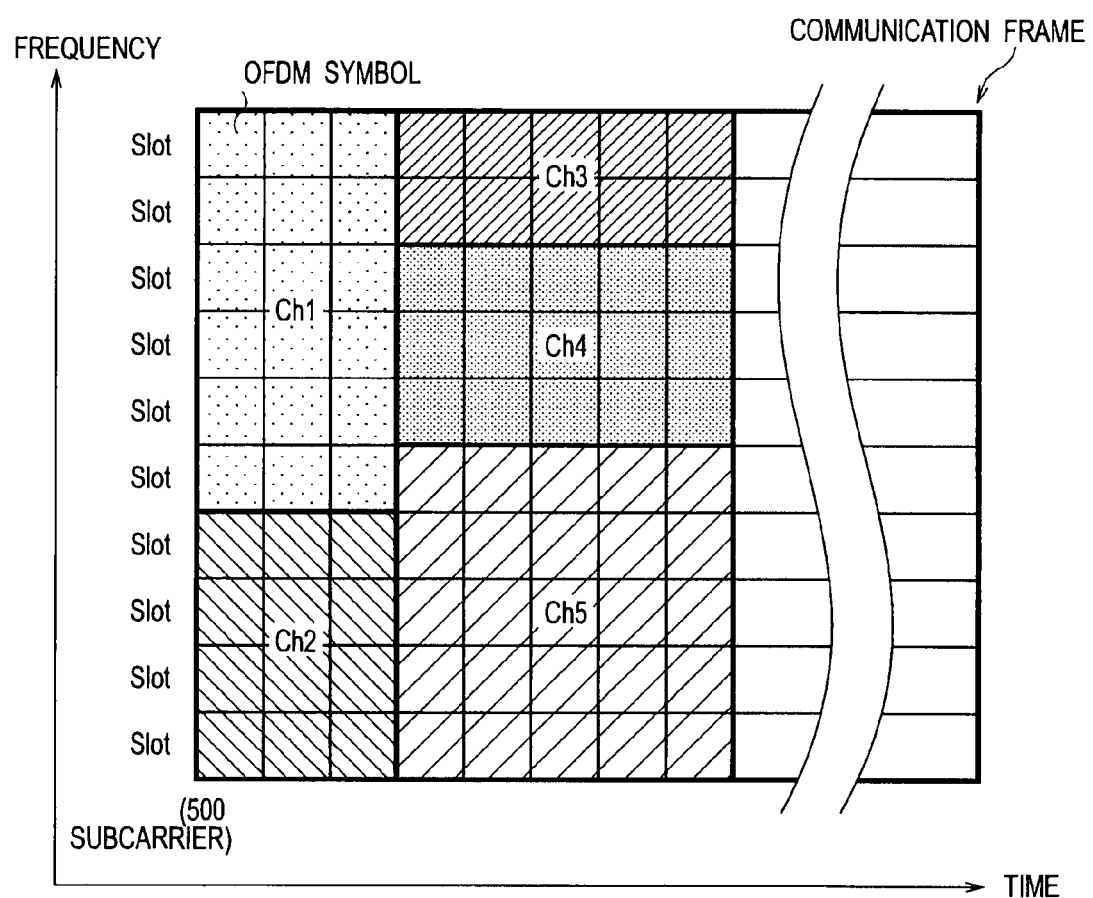
FIG. 24 is a view showing a transmission frame configuration of MediaFLO according to the other embodiment.

FIG. 24 shows a communication frame configuration of MediaFLO which is a broadcast communication method for mobile communications. The numbers of subcarriers and OFDM symbols, which are used for each channel, is changeable, and the most appropriate numbers of subcarriers and OFDM symbols for each channel are dynamically allocated.

For example, in FIG. 24, it is possible to have control such that the repeat transmission is applied to a channel (a communication channel) Ch1 and is not applied to a channel (a communication channel) Ch2.

In this manner, it should be understood that the present invention contains various embodiments and the like, which are not described here. Therefore, the present invention should be limited only by a patent particular matter of the scope of claims appropriate from the disclosure.

Please note that all the contents of Japanese Patent Application No. 2006-269990 (applied on Sep. 29, 2006) are included in the specification of this application by the reference.

INDUSTRIAL APPLICABILITY

A transmitter and a method for configuring a transmission frame according to the present invention is useful in the radio communication field such as mobile communications since it is possible to securely suppress multipath influence by equivalently increasing a guard interval length without changing a frame time length.

The invention claimed is:

1. A transmitter which transmits information in transmission frame to a receiver, the transmission frame including a plurality of transmission symbols and guard intervals, the guard intervals each obtained by replicating a fixed time period of the transmission symbol, comprising:
a transmission frame generator configured to, when two continuous transmission symbols are the same, generate the transmission frame by making phases of one transmission symbol out of the two transmission symbols and a guard interval thereof continuous with phases of the other transmission symbol and a guard interval thereof, wherein
the transmission frame generator includes:
a first guard interval adder configured to add the guard interval to immediately before an odd-numbered transmission symbol; and
a second guard interval adder configured to add the guard interval immediately after an even-numbered transmission symbol.

2. The transmitter according to claim 1, wherein the transmission frame generator includes:
a phase shifter configured to, after adding the guard interval, shift phases of the even-numbered transmission symbol and the guard interval thereof so that the phases of the even-numbered transmission symbol and the guard interval thereof are continuous with the phases of the odd-numbered transmission symbol and the guard interval thereof.

3. The transmitter according to any one of claims 1 and 2, wherein the transmission frame generator further includes:
a same symbol generator configured to generate two of the same transmission symbols by outputting the odd-numbered transmission symbol as the even-numbered transmission symbol.

4. The transmitter according to claim 3, wherein
the transmission frame generator further includes a propagation environment judging section configured to judge a propagation environment between the transmitter and the receiver, and
the same symbol generator switches whether or not to generate the two of the same transmission symbols in accordance with the propagation environment.

5. The transmitter according to claim 1, wherein
the transmission frame generator further includes a window processor configured to execute a window processing to attenuate head and end parts, on the time axis, of a transmission unit composed of a transmission symbol and a guard interval thereof, and
the window processor omits the window processing for a connected part of two transmission units having continuous phases.

6. The transmitter according to claim 5, wherein
the window processor executes:
a first window processing to attenuate head and end parts, on the time axis, of a transmission unit whose phase is not continuous with the phase of any one of the preceding and subsequent transmission units; and
a second window processing to attenuate head and end parts, on the time axis, of two transmission units having continuous phases, wherein a window length applied to the second window processing is longer than a window length applied to the first window processing.

7. The transmitter according to claim 1, wherein
the transmitter communicates with a plurality of receivers by a multicarrier communication method,
the transmission frame is divided into a plurality of communication channels in at least one of a frequency direction and a time direction,
the transmission frame generator generates a transmission unit composed of a transmission symbol and a guard interval thereof, and
the transmission frame generator generates a transmission unit having phase discontinuous with the phases of the preceding and subsequent transmission units, for a communication channel categorized into a first group among the plurality of communication channels, and generates two transmission units having continuous phases, for a communication channel categorized into a second group among the plurality of communication channels.

8. The transmitter according to claim 7, further comprising:
a modulation symbol generator configured to generate a modulation symbol corresponding to each subcarrier by implementing modulation and serial/parallel conversion on information to be transmitted to the receiver;
a modulation symbol storage configured to store the modulation symbol generated by the modulation symbol generator;
a modulation symbol selector configured to select any one of the modulation symbol generated by the modulation symbol generator and the modulation symbol stored by the modulation symbol storage; and
a generator configured to generate a transmission symbol by implementing the inverse Fourier transform and parallel/serial conversion on the modulation symbol selected by the modulation symbol selector.

9. The transmitter according to claim 8, wherein
the transmission frame generator further includes:
a window processor configured to execute a window processing to attenuate head and end parts, on the time axis, of a transmission unit composed of a transmission symbol and a guard interval thereof, wherein
the second guard interval adder shifts a connected part of a transmission symbol and a guard interval thereof forward on the time axis.

10. The transmitter according to claim 7, further comprising a transmission symbol generator configured to generate a first transmission symbol for a communication channel categorized into the first group, and to generate a second transmission symbol for a communication channel categorized into the second group, wherein
the transmission frame generator further includes:
a first transmission unit generator configured to generate a first transmission unit composed of a first transmission symbol and a guard interval thereof;
a second transmission unit generator configured to generate two second transmission units having continuous phases by making phases of one second transmission symbol out of two continuous second transmission symbols and a guard interval thereof continuous with phases of the other second transmission symbol and a guard interval thereof;
a first window processor configured to attenuate head and end parts of the first transmission unit generated by the first transmission unit generator;

a second window processor configured to attenuate head and end parts of the two second transmission units having continuous phases, the two second transmission units generated by the second transmission unit generator; and a combining section configured to combine output of the first window processor and output of the second window processor.

11. A method for configuring a transmission frame in a transmitter which transmits information in transmission frame to a receiver including a plurality of transmission symbols and guard intervals obtained by replicating a fixed time period of the transmission symbol, comprising:

generating the transmission frame by making phases of one transmission symbol out of the two transmission symbols and a guard interval thereof continuous with phases of the other transmission symbol and a guard interval thereof when two continuous transmission symbols are the same, wherein the generation further includes adding the guard interval to immediately before an odd-numbered transmission symbol, and adding the guard interval immediately after an even-numbered transmission symbol.

* * * * *